(12) United States Patent
Bocchino

(10) Patent No.: US 10,087,569 B2
(45) Date of Patent: Oct. 2, 2018

(54) MAINTENANCE FREE DRYER HAVING MULTIPLE SELF-CLEANING LINT FILTERS

(71) Applicant: WHIRLPOOL CORPORATION, Benton Harbor, MI (US)

(72) Inventor: Gianluca Bocchino, Fabriano (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/658,934

(22) Filed: Jul. 25, 2017

(65) Prior Publication Data

US 2018/0044844 A1   Feb. 15, 2018

Related U.S. Application Data

(60) Provisional application No. 62/372,825, filed on Aug. 10, 2016, provisional application No. 62/449,838, filed on Jan. 24, 2017.

(51) Int. Cl.

| | |
|---|---|
| *D06F 58/22* | (2006.01) |
| *D06F 58/02* | (2006.01) |
| *D06F 58/20* | (2006.01) |
| *D06F 58/24* | (2006.01) |
| *B01D 46/00* | (2006.01) |
| *B08B 3/02* | (2006.01) |

(52) U.S. Cl.
CPC .......... *D06F 58/22* (2013.01); *B01D 46/002* (2013.01); *B01D 46/0023* (2013.01); *B01D 46/0082* (2013.01); *B08B 3/02* (2013.01); *D06F 58/02* (2013.01); *D06F 58/206* (2013.01); *D06F 58/24* (2013.01)

(58) Field of Classification Search
CPC ... D06F 8/22; D06F 8/02; D06F 58/24; D06F 58/206; B01D 46/002; B01D 46/0082; B08B 3/02
USPC .............................................. 34/74, 595–610
See application file for complete search history.

(56) References Cited

U.S. PATENT DOCUMENTS

| | | | |
|---|---|---|---|
| 2,515,825 | A | 7/1950 | Grant |
| 2,873,041 | A | 2/1959 | Allen |
| 2,934,023 | A | 4/1960 | Lamkin et al. |
| 3,196,553 | A | 7/1965 | Deaton et al. |
| 3,218,730 | A | 11/1965 | Menk et al. |
| 3,342,961 | A | 9/1967 | Deaton et al. |
| 3,653,807 | A | 4/1972 | Platt |

(Continued)

FOREIGN PATENT DOCUMENTS

| | | |
|---|---|---|
| CN | 101967746 A | 2/2011 |
| CN | 105177914 A | 12/2015 |

(Continued)

*Primary Examiner* — Stephen M Gravini
(74) *Attorney, Agent, or Firm* — Price Heneveld LLP

(57) ABSTRACT

A laundry appliance includes a rotating drum for processing laundry. A blower directs process air through an air path that includes the rotating drum. A heat exchanger is positioned within the air path that cools and dehumidifies the process air. A plurality of air filters arranged sequentially captures lint from the process air at respective positions upstream of the heat exchanger. A filter spray system has a plurality of fluid sprayers that deliver fluid to a surface of each air filter of the plurality of air filters. Each fluid sprayer of the plurality of fluid sprayers directs captured lint away from a respective air filter of the plurality of air filters.

20 Claims, 12 Drawing Sheets

(56) References Cited

U.S. PATENT DOCUMENTS

| | | | |
|---|---|---|---|
| 3,805,404 | A | 4/1974 | Gould |
| 3,953,146 | A | 4/1976 | Sowards |
| 3,999,304 | A | 12/1976 | Doty |
| 4,134,518 | A | 1/1979 | Menchen |
| 4,137,647 | A | 2/1979 | Clark, Jr. |
| 4,260,876 | A | 4/1981 | Hochheiser |
| 4,261,179 | A | 4/1981 | Dageford |
| 4,860,921 | A | 8/1989 | Gidseg |
| 4,870,735 | A | 10/1989 | Jahr, Jr. et al. |
| 4,909,040 | A | 3/1990 | Feltrin |
| 5,285,664 | A | 2/1994 | Chang et al. |
| 5,600,966 | A | 2/1997 | Valence et al. |
| 5,628,122 | A | 5/1997 | Spinardi |
| 5,666,817 | A | 9/1997 | Schulak et al. |
| 5,720,536 | A | 2/1998 | Jenkins et al. |
| 5,927,095 | A | 7/1999 | Lee |
| 5,946,934 | A | 9/1999 | Kim et al. |
| 5,979,174 | A | 11/1999 | Kim et al. |
| 6,041,606 | A | 3/2000 | Kim |
| 6,073,458 | A | 6/2000 | Kim |
| 6,401,482 | B1 | 6/2002 | Lee et al. |
| 6,598,410 | B2 | 7/2003 | Temmyo et al. |
| 6,606,869 | B2 | 8/2003 | Takahashi et al. |
| 6,736,885 | B2 | 5/2004 | Kaiser |
| 6,797,044 | B2 | 9/2004 | Ou Yang et al. |
| 6,957,501 | B2 | 10/2005 | Park et al. |
| 6,973,799 | B2 | 12/2005 | Kuehl et al. |
| 6,983,615 | B2 | 1/2006 | Winders et al. |
| 7,008,032 | B2 | 3/2006 | Chekal et al. |
| 7,020,986 | B1 * | 4/2006 | Nakai ............... D06F 58/22 34/596 |
| 7,055,262 | B2 | 6/2006 | Goldberg et al. |
| 7,093,453 | B2 | 8/2006 | Asan et al. |
| 7,117,612 | B2 | 10/2006 | Slutsky et al. |
| 7,127,904 | B2 | 10/2006 | Schmid |
| 7,162,812 | B2 | 1/2007 | Cimetta et al. |
| 7,181,921 | B2 | 2/2007 | Nuiding |
| 7,207,181 | B2 | 4/2007 | Murray et al. |
| 7,254,960 | B2 | 8/2007 | Schmid et al. |
| 7,504,784 | B2 | 3/2009 | Asada et al. |
| 7,610,773 | B2 | 11/2009 | Rafalovich et al. |
| 7,624,514 | B2 | 12/2009 | Konabe et al. |
| 7,665,225 | B2 | 2/2010 | Goldberg et al. |
| 7,707,860 | B2 | 5/2010 | Hong et al. |
| 7,775,065 | B2 | 8/2010 | Ouseph et al. |
| 7,866,057 | B2 | 1/2011 | Grunert et al. |
| 7,895,771 | B2 | 3/2011 | Prajescu et al. |
| 7,934,695 | B2 | 5/2011 | Sim et al. |
| 7,980,093 | B2 | 7/2011 | Kuehl et al. |
| 8,024,948 | B2 | 9/2011 | Kitamura et al. |
| 8,056,254 | B2 | 11/2011 | Loffler et al. |
| 8,074,469 | B2 | 12/2011 | Hamel et al. |
| 8,079,157 | B2 | 12/2011 | Balerdi Azpilicueta et al. |
| 8,099,975 | B2 | 1/2012 | Rafalovich et al. |
| 8,104,191 | B2 | 1/2012 | Ricklefs et al. |
| 8,166,669 | B2 | 5/2012 | Park et al. |
| 8,181,359 | B2 * | 5/2012 | Bae ............... D06F 58/203 134/22.12 |
| 8,182,612 | B2 | 5/2012 | Grunert |
| 8,240,064 | B2 * | 8/2012 | Steffens ............... D06F 58/22 34/210 |
| 8,245,347 | B2 | 8/2012 | Goldberg et al. |
| 8,266,813 | B2 * | 9/2012 | Grunert ............... D06F 58/206 34/595 |
| 8,266,815 | B2 * | 9/2012 | Goldberg ............... D06F 58/20 15/104.04 |
| 8,266,824 | B2 | 9/2012 | Steiner |
| 8,276,293 | B2 | 10/2012 | Ricklefs et al. |
| 8,377,224 | B2 | 2/2013 | Grunert |
| 8,382,887 | B1 | 2/2013 | Alsaffar |
| 8,434,317 | B2 | 5/2013 | Besore |
| 8,438,750 | B2 | 5/2013 | Dittmer et al. |
| 8,484,862 | B2 | 7/2013 | Nawrot et al. |
| 8,572,862 | B2 | 11/2013 | TeGrotenhuis |
| 8,601,830 | B2 | 12/2013 | Lee et al. |
| 8,615,895 | B2 * | 12/2013 | Shin ............... D06F 58/22 34/606 |
| 8,656,604 | B2 | 2/2014 | Ediger et al. |
| 8,667,705 | B2 | 3/2014 | Shin et al. |
| 8,695,230 | B2 | 4/2014 | Noh et al. |
| 8,770,682 | B2 | 7/2014 | Lee et al. |
| 8,789,287 | B2 * | 7/2014 | Kim ............... D06F 58/22 34/480 |
| 8,789,290 | B2 | 7/2014 | Grunert |
| 8,857,071 | B2 | 10/2014 | Lee et al. |
| 8,910,394 | B2 | 12/2014 | Steffens |
| 8,915,104 | B2 | 12/2014 | Beihoff et al. |
| 8,984,767 | B2 | 3/2015 | Grunert et al. |
| 9,010,145 | B2 | 4/2015 | Lim et al. |
| 9,022,228 | B2 | 5/2015 | Grunert |
| 9,027,256 | B2 | 5/2015 | Kim et al. |
| 9,027,371 | B2 | 5/2015 | Beihoff et al. |
| 9,052,142 | B2 | 6/2015 | Kim et al. |
| 9,062,410 | B2 | 6/2015 | Ahn et al. |
| 9,085,843 | B2 | 7/2015 | Doh et al. |
| 9,103,569 | B2 | 8/2015 | Cur et al. |
| 9,134,067 | B2 | 9/2015 | Ahn et al. |
| 9,140,472 | B2 | 9/2015 | Shin et al. |
| 9,140,481 | B2 | 9/2015 | Cur et al. |
| 9,212,450 | B2 | 12/2015 | Grunert et al. |
| 9,249,538 | B2 | 2/2016 | Bison et al. |
| 9,299,332 | B2 | 3/2016 | Je |
| 9,328,448 | B2 | 5/2016 | Doh et al. |
| 9,328,449 | B2 | 5/2016 | Doh et al. |
| 9,334,601 | B2 | 5/2016 | Doh et al. |
| 9,335,095 | B2 * | 5/2016 | Bison ............... D06F 39/12 |
| 9,356,542 | B2 | 5/2016 | Ragogna et al. |
| 9,359,714 | B2 | 6/2016 | Contarini et al. |
| 9,372,031 | B2 | 6/2016 | Contarini et al. |
| 9,435,069 | B2 | 9/2016 | Contarini et al. |
| 9,441,322 | B2 * | 9/2016 | Kim ............... D06F 58/206 |
| 9,487,910 | B2 | 11/2016 | Huang et al. |
| 9,488,412 | B2 * | 11/2016 | Yu ............... F26B 25/005 |
| 9,506,689 | B2 | 11/2016 | Carbajal et al. |
| 9,534,329 | B2 | 1/2017 | Contarini et al. |
| 9,534,340 | B2 | 1/2017 | Cavarretta et al. |
| 9,605,375 | B2 | 3/2017 | Frank et al. |
| 9,644,306 | B2 | 5/2017 | Doh et al. |
| 9,650,735 | B2 * | 5/2017 | Doh ............... D06F 29/005 |
| 9,657,431 | B2 * | 5/2017 | Kim ............... D06F 58/22 |
| 9,663,894 | B2 | 5/2017 | Kim et al. |
| 9,677,215 | B2 * | 6/2017 | Kim ............... D06F 58/22 |
| 9,803,909 | B2 | 10/2017 | Son et al. |
| 9,803,910 | B2 | 10/2017 | Kim et al. |
| 2004/0139757 | A1 | 7/2004 | Kuehl et al. |
| 2005/0217139 | A1 | 10/2005 | Hong |
| 2005/0229614 | A1 | 10/2005 | Ansted |
| 2005/0268623 | A1 | 12/2005 | Urakubo et al. |
| 2006/0070385 | A1 | 4/2006 | Narayanamurthy et al. |
| 2006/0196217 | A1 | 9/2006 | Duarte et al. |
| 2007/0033962 | A1 | 2/2007 | Kang et al. |
| 2008/0141699 | A1 | 6/2008 | Rafalovich et al. |
| 2008/0196266 | A1 | 8/2008 | Jung et al. |
| 2008/0307823 | A1 | 12/2008 | Lee et al. |
| 2009/0071032 | A1 | 3/2009 | Kreutzfeldt et al. |
| 2009/0158767 | A1 | 6/2009 | McMillin |
| 2009/0158768 | A1 | 6/2009 | Rafalovich et al. |
| 2009/0165491 | A1 | 7/2009 | Rafalovich et al. |
| 2009/0260371 | A1 | 10/2009 | Kuehl et al. |
| 2009/0266089 | A1 | 10/2009 | Haussmann |
| 2010/0011608 | A1 | 1/2010 | Grunert et al. |
| 2010/0101606 | A1 | 4/2010 | Grunert |
| 2010/0107703 | A1 | 5/2010 | Hisano et al. |
| 2010/0146809 | A1 | 6/2010 | Grunert et al. |
| 2010/0154240 | A1 | 6/2010 | Grunert |
| 2010/0212368 | A1 | 8/2010 | Kim et al. |
| 2011/0011119 | A1 | 1/2011 | Kuehl et al. |
| 2011/0030238 | A1 | 2/2011 | Nawrot et al. |
| 2011/0036556 | A1 | 2/2011 | Bison et al. |
| 2011/0072849 | A1 | 3/2011 | Kuehl et al. |
| 2011/0209484 | A1 | 9/2011 | Krausch et al. |
| 2011/0277334 | A1 | 11/2011 | Lee et al. |
| 2011/0280736 | A1 | 11/2011 | Lee et al. |

(56) References Cited

U.S. PATENT DOCUMENTS

| | | |
|---|---|---|
| 2012/0017456 A1 | 1/2012 | Grunert |
| 2012/0266627 A1 | 10/2012 | Lee |
| 2012/0272689 A1 | 11/2012 | Elger et al. |
| 2013/0008049 A1 | 1/2013 | Patil |
| 2013/0104579 A1 | 5/2013 | Zhou |
| 2013/0104946 A1 | 5/2013 | Grunert et al. |
| 2013/0111941 A1 | 5/2013 | Yu et al. |
| 2013/0212894 A1 | 8/2013 | Kim et al. |
| 2013/0263630 A1 | 10/2013 | Doh et al. |
| 2013/0276327 A1 | 10/2013 | Doh et al. |
| 2013/0318813 A1* | 12/2013 | Hong ................. D06F 25/00 34/380 |
| 2013/0340797 A1 | 12/2013 | Bommels et al. |
| 2014/0020260 A1 | 1/2014 | Carow et al. |
| 2014/0026433 A1 | 1/2014 | Bison et al. |
| 2014/0075682 A1 | 3/2014 | Filippetti et al. |
| 2014/0109428 A1 | 4/2014 | Kim et al. |
| 2014/0190032 A1 | 7/2014 | Lee et al. |
| 2014/0216706 A1 | 8/2014 | Melton et al. |
| 2014/0260356 A1 | 9/2014 | Wu |
| 2014/0290091 A1 | 10/2014 | Bison et al. |
| 2014/0366397 A1 | 12/2014 | Wakizaka et al. |
| 2015/0015133 A1 | 1/2015 | Carbajal et al. |
| 2015/0033806 A1 | 2/2015 | Cerrato et al. |
| 2015/0064069 A1 | 3/2015 | Yi et al. |
| 2015/0285551 A1 | 10/2015 | Aiken et al. |
| 2015/0308034 A1 | 10/2015 | Cavarretta et al. |
| 2015/0322618 A1 | 11/2015 | Bisaro et al. |
| 2016/0010271 A1 | 1/2016 | Shin et al. |
| 2016/0040350 A1 | 2/2016 | Xu et al. |
| 2016/0083894 A1 | 3/2016 | Bison et al. |
| 2016/0083896 A1 | 3/2016 | Ryoo et al. |
| 2016/0115636 A1 | 4/2016 | Kim et al. |
| 2016/0115639 A1 | 4/2016 | Kim et al. |
| 2016/0138208 A1 | 5/2016 | Bison et al. |
| 2016/0138209 A1 | 5/2016 | Kitayama et al. |
| 2016/0145793 A1 | 5/2016 | Ryoo et al. |
| 2016/0178267 A1 | 6/2016 | Hao et al. |
| 2016/0186374 A1 | 6/2016 | Ryoo et al. |
| 2016/0258107 A1* | 9/2016 | Hake ................. D06F 15/02 |
| 2016/0258671 A1 | 9/2016 | Allard et al. |
| 2016/0265833 A1 | 9/2016 | Yoon et al. |
| 2016/0282032 A1 | 9/2016 | Gomes et al. |
| 2016/0290702 A1 | 10/2016 | Sexton et al. |
| 2016/0305696 A1 | 10/2016 | Kobayashi et al. |
| 2016/0348957 A1 | 12/2016 | Hitzelberger et al. |
| 2016/0376744 A1* | 12/2016 | Lv ..................... F28F 9/001 34/73 |
| 2017/0246333 A1 | 8/2017 | Carbone et al. |
| 2017/0307280 A1 | 10/2017 | Schmidt et al. |
| 2018/0044844 A1* | 2/2018 | Bocchino .............. D06F 58/22 |
| 2018/0044845 A1* | 2/2018 | Bocchino .............. D06F 58/22 |
| 2018/0105971 A1* | 4/2018 | Civanelli .............. D06F 58/22 |

FOREIGN PATENT DOCUMENTS

| | | | |
|---|---|---|---|
| CN | 105696291 A | 6/2016 | |
| DE | 3147796 | 3/1983 | |
| DE | 3738031 A1 | 5/1989 | |
| DE | 4304372 A1 | 8/1994 | |
| DE | 4409607 A1 | 10/1994 | |
| DE | 10002742 C1 | 6/2001 | |
| DE | 10116238 B4 | 3/2005 | |
| DE | 10002743 B4 | 1/2006 | |
| DE | 102005041145 A1 | 3/2007 | |
| DE | 102006018469 A1 | 10/2007 | |
| DE | 102007052835 A1 | 5/2009 | |
| DE | 102008033388 A1 | 1/2010 | |
| DE | 102008054832 | 7/2010 | |
| DE | 102009001610 A1 * | 9/2010 | ............ D06F 58/02 |
| DE | 102009046921 | 5/2011 | |
| DE | 102012223777 | 6/2014 | |
| DE | 112012006737 T5 | 4/2015 | |
| EP | 468573 A1 | 1/1992 | |
| EP | 0816549 A2 | 1/1998 | |
| EP | 999302 A1 | 5/2000 | |
| EP | 1055767 A1 | 11/2000 | |
| EP | 1987190 A1 | 11/2008 | |
| EP | 2134896 B1 | 12/2009 | |
| EP | 2189568 A1 | 5/2010 | |
| EP | 2202349 | 6/2010 | |
| EP | 2284310 A1 | 2/2011 | |
| EP | 2324152 B1 | 5/2011 | |
| EP | 2341178 A1 | 7/2011 | |
| EP | 2386679 | 11/2011 | |
| EP | 2455526 A1 | 5/2012 | |
| EP | 2466001 A1 | 6/2012 | |
| EP | 2497856 A1 | 9/2012 | |
| EP | 2508668 A1 * | 10/2012 | ............ D06F 58/24 |
| EP | 2559805 | 2/2013 | |
| EP | 2581489 | 4/2013 | |
| EP | 2612964 A1 | 7/2013 | |
| EP | 2612965 A1 | 7/2013 | |
| EP | 2612966 A1 | 7/2013 | |
| EP | 2634301 A1 | 9/2013 | |
| EP | 2708636 | 3/2014 | |
| EP | 2708639 | 3/2014 | |
| EP | 2733257 A1 | 5/2014 | |
| EP | 2746455 A1 | 6/2014 | |
| EP | 2594687 B1 | 9/2014 | |
| EP | 2966215 | 1/2016 | |
| EP | 3015594 | 5/2016 | |
| EP | 2468949 B1 | 6/2016 | |
| EP | 3034675 A1 | 6/2016 | |
| GB | 2087029 A | 5/1982 | |
| JP | 2000018796 | 1/2000 | |
| JP | 2004053055 | 2/2004 | |
| JP | 2006187449 | 7/2006 | |
| JP | 2013085687 | 5/2013 | |
| KR | 20100031929 A | 3/2010 | |
| NL | 7801958 A | 8/1979 | |
| WO | 2005001357 A1 | 1/2005 | |
| WO | 2005032322 A2 | 4/2005 | |
| WO | 2007013327 A1 | 2/2007 | |
| WO | 2007093461 A1 | 8/2007 | |
| WO | 2008077708 A1 | 7/2008 | |
| WO | 2008110451 A1 | 9/2008 | |
| WO | 2009031812 A2 | 3/2009 | |
| WO | 2009059874 A1 | 5/2009 | |
| WO | 2009077291 A1 | 6/2009 | |
| WO | 2010028992 A1 | 3/2010 | |
| WO | 2010071355 A2 | 6/2010 | |
| WO | 2010102892 A1 | 9/2010 | |
| WO | 2010112321 A1 | 10/2010 | |
| WO | 2010118939 A1 | 10/2010 | |
| WO | 2011057954 | 5/2011 | |
| WO | 2011061068 | 5/2011 | |
| WO | 2012022803 | 2/2012 | |
| WO | 2012065916 A1 | 5/2012 | |
| WO | 2012093059 A1 | 7/2012 | |
| WO | 2012101028 A1 | 8/2012 | |
| WO | 2012134149 A2 | 10/2012 | |
| WO | 2012138136 A2 | 10/2012 | |
| WO | 2013129779 A1 | 9/2013 | |
| WO | 2013144763 A2 | 10/2013 | |
| WO | 2013144764 A1 | 10/2013 | |
| WO | 2014001950 A1 | 1/2014 | |
| WO | 2014040923 | 3/2014 | |
| WO | 2014041097 | 3/2014 | |
| WO | 2014076149 A1 | 5/2014 | |
| WO | 2014095790 A1 | 6/2014 | |
| WO | 2014102073 A1 | 7/2014 | |
| WO | 2014102144 A1 | 7/2014 | |
| WO | 2014102317 | 7/2014 | |
| WO | 2014102322 | 7/2014 | |
| WO | 2014154278 A1 | 10/2014 | |
| WO | 2015003742 A1 | 1/2015 | |
| WO | 2015028270 | 3/2015 | |
| WO | 2015074837 A1 | 5/2015 | |
| WO | 2015082011 A1 | 6/2015 | |
| WO | 2015101386 | 7/2015 | |
| WO | 2015101387 | 7/2015 | |
| WO | 2015101388 | 7/2015 | |

(56) References Cited

FOREIGN PATENT DOCUMENTS

| WO | 2015101892 | 9/2015 |
| WO | 2015160172 | 10/2015 |
| WO | 2016006900 A1 | 1/2016 |
| WO | 2016020852 A1 | 2/2016 |
| WO | 2016085432 | 6/2016 |
| WO | 2016095970 | 6/2016 |
| WO | 2016150660 A1 | 9/2016 |

* cited by examiner

MAINTENANCE FREE DRYER HAVING MULTIPLE SELF-CLEANING LINT FILTERS

CROSS-REFERENCE TO RELATED APPLICATIONS

This application claims priority to and the benefit under 35 U.S.C. § 119(e) of U.S. Provisional Patent Application No. 62/372,825, filed on Aug. 10, 2016, entitled "MAINTENANCE FREE DRYER HAVING MULTIPLE SELF-CLEANING LINT FILTERS," and U.S. Provisional Patent Application No. 62/449,838, filed on Jan. 24, 2017, entitled "MAINTENANCE FREE DRYER HAVING MULTIPLE SELF-CLEANING LINT FILTERS," the entire disclosures of which are hereby incorporated herein by reference.

FIELD OF THE DEVICE

The device is in the field of laundry appliances, more specifically, a maintenance free laundry appliance having a plurality of self-cleaning lint filters.

SUMMARY OF THE DISCLOSURE

In at least one aspect, a laundry appliance includes a rotating drum for processing laundry. A blower directs process air through an air path that includes the rotating drum. A heat exchanger is positioned within the air path that cools and dehumidifies the process air. A plurality of air filters arranged sequentially captures lint from the process air at respective positions upstream of the heat exchanger. A filter spray system has a plurality of fluid sprayers that deliver fluid to a surface of each air filter of the plurality of air filters. Each fluid sprayer of the plurality of fluid sprayers directs captured lint away from a respective air filter of the plurality of air filters.

In at least another aspect, a lint removal system for a laundry appliance includes an air moving unit that directs process air through an air path for processing laundry. A heat exchanger dehumidifies the process air within the air path. First and second lint filters are positioned upstream of the heat exchanger for capturing lint particles from the process air. A first fluid sprayer directs fluid to a surface of the first lint filter for removing captured lint from the first lint filter. A second fluid sprayer directs the fluid to a surface of the second lint filter for removing the captured lint from the second lint filter. A diverter valve selectively apportions the fluid between the first and second fluid sprayers, wherein the fluid from the first and second fluid sprayers and the captured lint from the first and second lint filters are directed to a common drain channel.

In at least another aspect, a lint removal system for a laundry appliance includes a plurality of air filters that capture lint within an air path at a position upstream of a heat exchanger. A plurality of fluid sprayers direct fluid onto the plurality of air filters, respectively, to remove captured lint from the plurality of air filters. A diverter valve apportions the fluid between the plurality of fluid sprayers. A drain channel is positioned below the heat exchanger and below the plurality of air filters to receive condensate from the heat exchanger and receive the fluid and captured lint from the plurality of air filters.

These and other features, advantages, and objects of the present device will be further understood and appreciated by those skilled in the art upon studying the following specification, claims, and appended drawings.

DETAILED DESCRIPTION OF EMBODIMENTS

Figure 1:
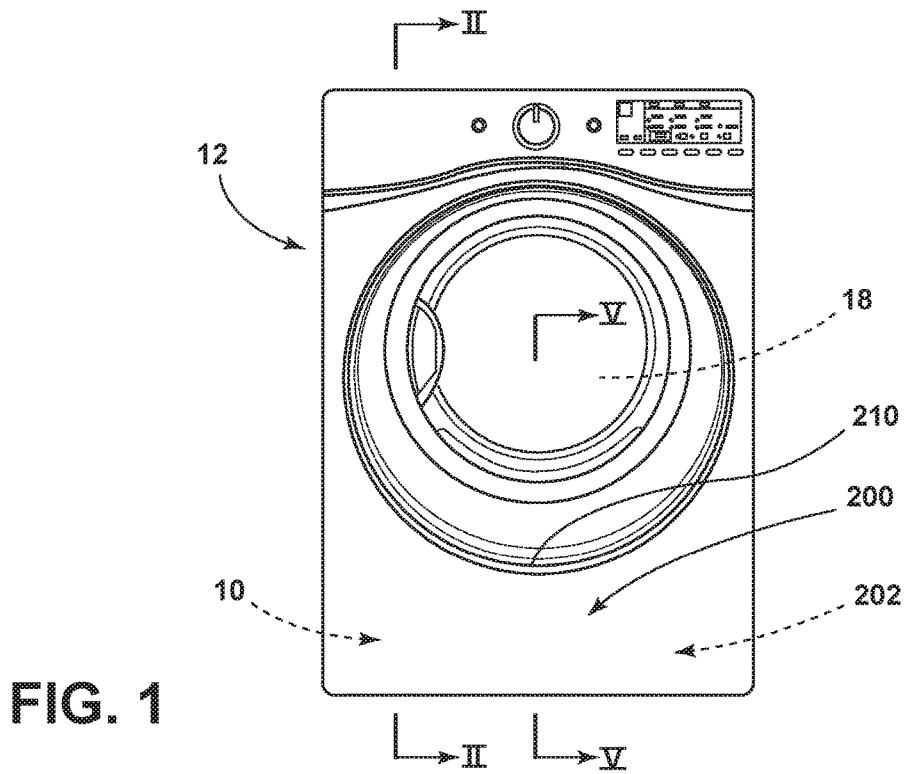
FIG. 1 is a front elevational view of a laundry appliance incorporating an aspect of the multi-filter lint removal system.
Figure 2:
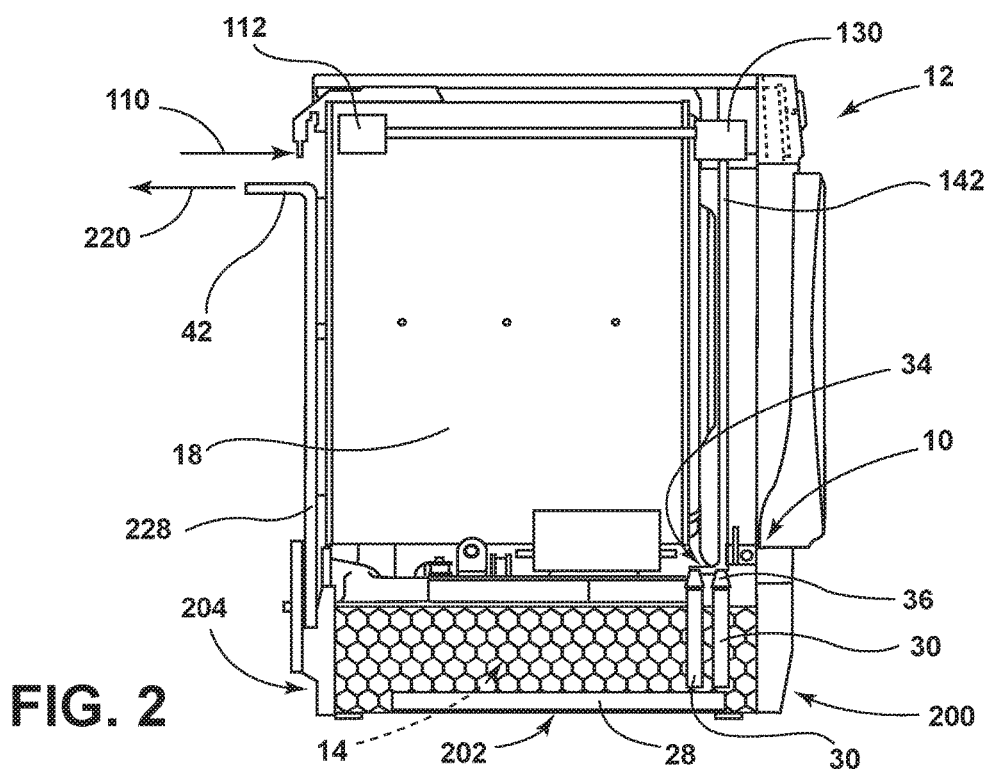
FIG. 2 is a cross-sectional view of the appliance of FIG. 1 taken along line II-II.
Figure 3:
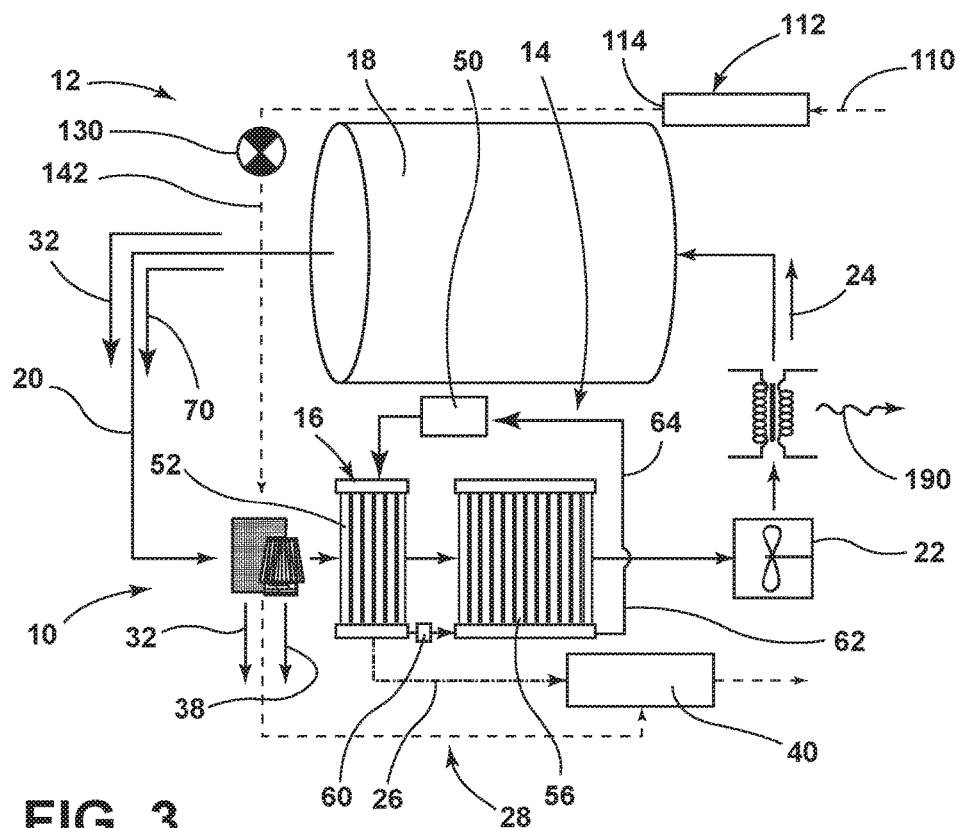
FIG. 3 is a schematic diagram illustrating an aspect of a laundry appliance incorporating a heat pump system.
Figure 4:
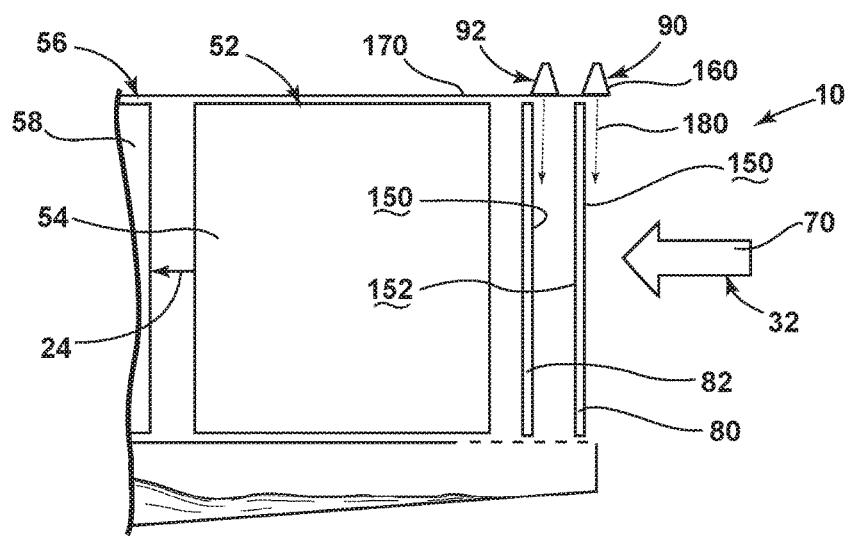
FIG. 4 is a schematic diagram illustrating an aspect of the multi-filter lint removal system.
Figure 5:
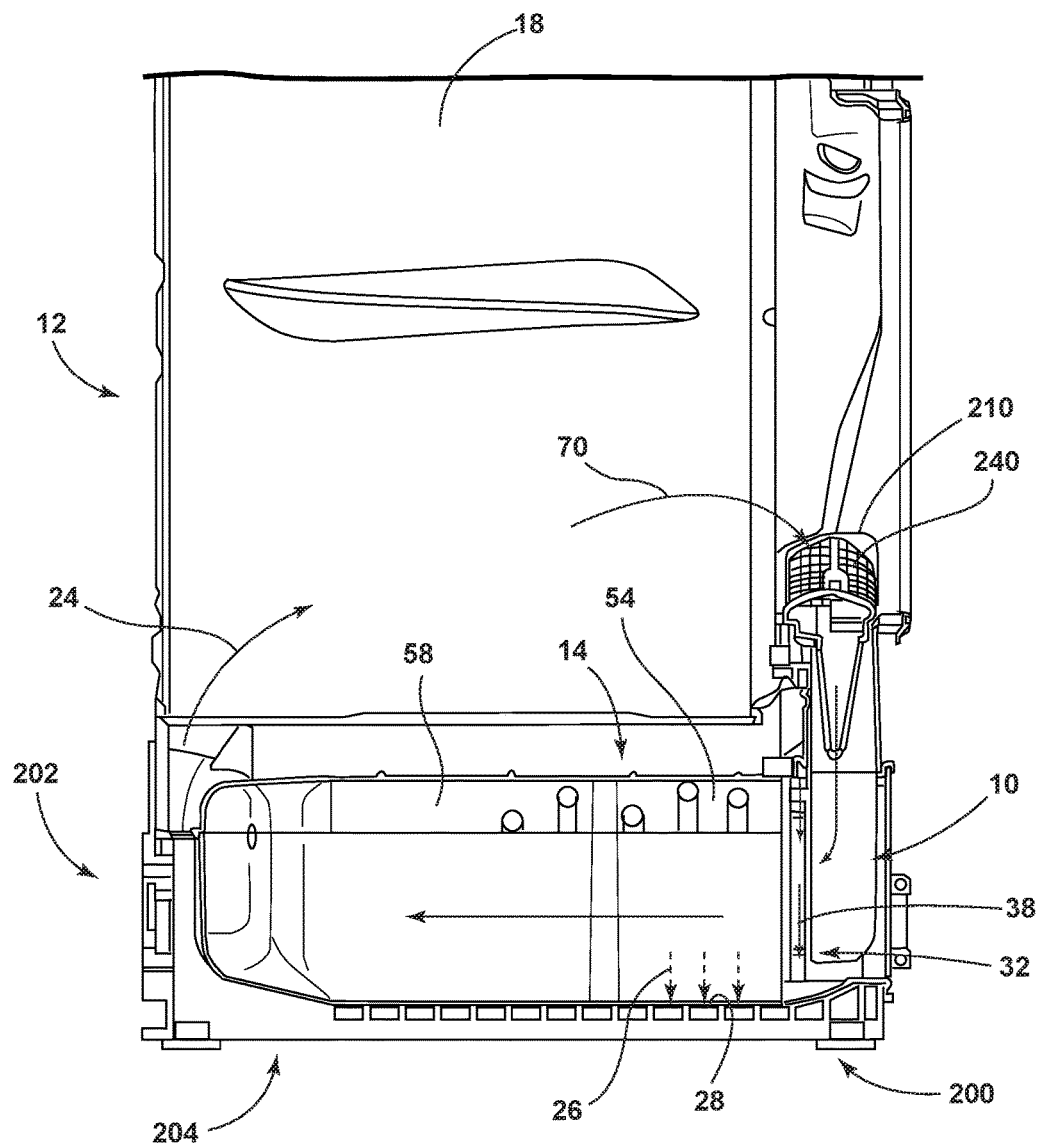
FIG. 5 is a partial cross-sectional view of the laundry appliance of FIG. 1, taken along line V-V.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-8, reference numeral 10 generally refers to a lint removal system for a laundry appliance 12, or other appliance incorporating a heat pump system 14 having a plurality of heat exchangers 16. It is contemplated that the laundry appliance 12 can include a rotating drum 18 and an air path 20 having an air moving unit 22 adapted to deliver air 24 through the air path 20 and through the rotating drum 18. At least a portion of the heat pump system 14 is positioned within the air path 20, and, in particular, at least one of the heat exchangers 16 of the heat pump system 14. The heat pump system 14 serves to condition air 24 within the air path 20 for heating and cooling the air 24 within the air path 20 and also extracting moisture and humidity in the form of condensate 26 from air 24 delivered from the rotating drum 18. The heat exchanger 16 of the heat pump system 14 is adapted to cool and dehumidify air 24 within the air path 20. The heat exchanger 16 condenses moisture within the air 24 into condensate 26 that is captured within a drain channel 28 positioned below the heat exchanger 16. A plurality of air filters 30 are positioned upstream from the heat exchanger 16. The plurality of air filters 30 serve to remove lint 32 from the air 24 delivered to the heat exchangers 16 within the air path 20. Accordingly, a plurality of air filters 30 serve to capture lint 32 within the air 24 of the air path 20 so that the lint 32 does not adhere, or substantially does not adhere, to the heat exchanger 16 of the heat pump system 14. A filter spray system 34 is disposed in communication with the plurality of air filters 30. The filter spray system 34 includes a plurality of fluid sprayers 36 that deliver fluid 38 to each air filter 30 of the plurality of air filters 30. The fluid 38 sprayed onto the plurality of air filters 30 is captured by the drain channel 28. Accordingly, lint 32 present on any one or more of the plurality of air filters 30 is sprayed off by the plurality of fluid sprayers 36 such that the fluid 38 from the sprayers and the lint 32 from the plurality of air filters 30 is moved from the plurality of air filters 30 to the drain channel 28. A fluid pump 40 is disposed in communication with the drain channel 28 and the fluid outlet 42. In this manner, the fluid pump 40 operates to deliver fluid 38 and lint 32 from the drain channel 28 to the fluid outlet 42 and to the exterior of the laundry appliance 12.

Referring again to FIGS. 2-8, the heat pump system 14 for the laundry appliance 12 can include a compressor 50, a first heat exchanger 52 in the form of an evaporator 54 that extracts heat 190 at least from air 24 moving through the air path 20 of the laundry appliance 12 and a second heat exchanger 56 in the form of a condenser 58 that releases heat 190 for use in the laundry appliance 12. The heat pump system 14 also includes an expansion device 60 and a refrigerant 62 that moves through a refrigerant line 64 that connects the various components of the heat pump system 14. The operation of a refrigerant-powered heat pump within an appliance is generally known by those having skill in the art.

Referring again to FIGS. 2-8, during operation of the laundry appliance 12, typically in the form of a dryer for processing laundry, wet clothing is placed within the rotating drum 18 to be dried. The air moving unit 22, typically in the form of a blower, moves air 24 through the air path 20 and across the damp clothing placed within the drum 18. The blower moves air 24 across the condenser 58 or other heat source such that the air 24 is heated before it moves into the drum 18. The heated air 24 moves across the wet clothing within the drum 18 and extracts moisture from the clothing such that the heated air 24 becomes heated and humid air 70. In addition to moisture, the heated air 24 also collects lint 32 from the clothing disposed within the drum 18. The heated and humid air 70 that also contains lint 32 is then moved through the plurality of filters wherein the lint 32 carried within the heated and humid air 70 is captured within the plurality of filters. The heated and humid air 70 moves from the plurality of filters to the evaporator 54 or heat sink that extracts heat 190 from the heated and humid air 70. The extraction of heat 190 also causes condensation of the humidity within the heated and humid air 70 from the drum 18. This condensation precipitates from the air 24 and is captured within the drain channel 28 positioned below the evaporator 54. The air 24 is then moved back to the condenser 58 and/or other heat source to be cycled through the air path 20 and drum 18 once again.

Referring again to FIGS. 2-8, the lint removal system 10 can include a plurality of air filters 30 for removing lint 32 from air 24 in the air path 20. The plurality of air filters 30 can include first and second lint filters 80, 82 where the second lint filter 82 has a second mesh size smaller than a first mesh size of the first lint filter 80. Accordingly, the first lint filter 80 captures particles of lint 32 having a larger size, which typically accounts for the majority of lint 32 carried within the heated and humid air 70 delivered from the drum 18. Smaller particles of lint 32 not captured by the first lint filter 80 are then moved toward the second lint filter 82 having the smaller second mesh size. Smaller particles of lint 32 are then captured by the second lint filter 82. It is also contemplated, in various embodiments, that the lint removal system 10 can also include a third lint filter 84 having a third mesh size smaller than the second mesh size of the second lint filter 82. In such an embodiment, even smaller particles of lint 32 that pass through the second lint filter 82 may be captured by the third lint filter 84, such that the vast majority of lint carried by the heated and humid air 70 emanating from the rotating drum 18 can be captured within the lint removal system 10. It is also contemplated that the lint removal system 10 may include more than three air filters 30 where each successive air filter 30 includes a mesh size that is smaller than the previous air filter 30 within the plurality of air filters 30.

Referring again to FIGS. 2-8, the filter spray system 34 includes a plurality of filter sprayers that are paired with a corresponding air filter 30. In this manner, a first fluid sprayer 90 is paired with the first lint filter 80, a second fluid sprayer 92 is paired with the second lint filter 82, and a third fluid sprayer 94 is paired with a third lint filter 84, and so on for each air filter 30 within the lint removal system 10. According to the various embodiments, each of the first, second and third fluid sprayers 90, 92, 94 can include two or more subsprayers 96 that are adapted to spray fluid 38 on corresponding filter portions 98 of the respective first, second and third lint filters 80, 82, 84. In this manner, fluid 38 delivered to the first fluid sprayer 90 can be separately apportioned between the subsprayers 96 of the first and second fluid sprayer 90, 92. In this manner, different filter portions 98 of the first lint filter 80 can be sprayed through use of the subsprayers 96 of the first fluid sprayer 90, and so on for each air filter 30.

Referring again to FIGS. 2-8, the use of subsprayers 96 is incorporated such that filter portions 98 of each air filter 30 of the plurality of air filters 30 can be washed at different times. As each filter portion 98 of the various air filters 30 is washed, fluid 38 may adhere to the mesh openings of a particular filter portion 98. Air 24 moving through the particular filter portion 98 can, over time, dislodge, remove, evaporate, or otherwise eliminate the adhered fluid 38 from within the particular filter portion 98. However, while the fluid 38 is adhered to the particular filter portion 98, the filter portion 98 may be temporarily blocked from allowing air 24 to pass through that filter portion 98.

The use of subsprayers 96 for each of the first, second and third lint filters 80, 82, 84 allows for the passage of air 24 within the air path 20 through various filter portions 98 that have not yet been sprayed. This passage of air 24 through the unsprayed filter portions 100 of each air filter 30 also provides for a faster and more expedient removal of the adhered fluid 38 from the sprayed filter portions 102 of the particular air filter 30. Accordingly, the use of the subsprayers 96 within each of the first, second and third fluid sprayers 90, 92, 94 can be sequenced during a particular washing cycle to account for the removal of any adhered fluid 38 within the recently sprayed filter portions 102 of the first, second and third lint filters 80, 82, 84. The subsprayers 96 or nozzles 160 of each of the first, second and third fluid sprayers 90, 92, 94 can be separated into two subsprayers 96, three subsprayers 96, or combinations thereof. The exact number of subsprayers 96 or nozzles 160 for washing each air filter 30 can vary depending upon the amount of lint 32 typically being captured/sprayed, the frequency of spraying cycles, the position of the particular fluid sprayers 36/corresponding air filter 30, combinations thereof, and other similar factors that can bear on the amount of subsprayers 96 needed for a particular air filter 30 within the lint removal system 10.

Referring again to FIGS. 2-10, fluid 38 used for the filter spray system 34 can be obtained through an external fluid source 110, such as a wall spigot external to the laundry appliance 12. According to various embodiments, it is contemplated that fluid 38 can be captured through a recycling of condensate 26 captured within the drain channel 28 or other container during use of the heat pump system 14.

Referring again to FIGS. 2-12, the laundry appliance 12 can include an electrovalve 112 that regulates the flow of fluid 38, typically water, from the external fluid source 110, or other source of fluid 38. The electrovalve 112 can be a solenoid, stepper motor, servo motor, combinations thereof, or other similar electrically operated motor. The electrovalve 112 for receiving fluid 38 from the external fluid source 110 can include a single fluid valve 114 that is activated and deactivated for delivering fluid 38 from the external fluid source 110 to the filter spray system 34. It is also contemplated that the electrovalve 112 can include a plurality of fluid valves 114 for separately and independently delivering fluid 38 from the external fluid source 110 to various portions of the laundry appliance 12. Fluid valves 114 contained within the electrovalve 112 can be used for delivering fluid 38 to a sprayer system that disposes water within the rotating drum 18, or other similar uses not necessarily related to the filter spray system 34. It is also contemplated that the electrovalve 112 can include a fluid valve 114 that is separately and independently operable and in communication with each of the first, second and third fluid sprayers 90, 92, 94. Accordingly, a first fluid valve 116 may be used for delivering fluid 38 to the first fluid sprayer 90 for cleaning the first lint filter 80. A second fluid valve 118 can be used for delivering fluid 38 to the second fluid sprayer 92 for cleaning the second lint filter 82. Similarly, a third fluid valve 120 can be used for delivering fluid 38 to the third fluid sprayer 94 for cleaning the third lint filter 84. The various fluid valves 114 can be sequenced to open and close separately, simultaneously, in patterns, in combinations, or other sequences. It should be understood that the exact configuration of the electrovalve 112 and the various fluid valves 114 can be modified depending upon the particular design of the laundry appliance 12 and the configuration of the lint removal system 10.

Referring again to FIGS. 2-10, downstream from the electrovalve 112 and the one or more fluid valves 114, a diverter valve 130 is positioned for apportioning fluid 38 between the plurality of fluid sprayers 36, between the subsprayers 96 for each fluid sprayer 36, or both. The diverter valve 130 can be in the form of a stepper motor, solenoid, servo motor, or other similar electrically operated valve for apportioning fluid 38 between the various subsprayers 96 and/or the first, second and third fluid sprayers 90, 92, 94.

According to various embodiments, it is contemplated that a primary diverter valve 140 can be in communication with the electrovalve 112, where the primary diverter valve 140 is operable between a plurality of positions, each corresponding to one of the first, second or third fluid sprayer 90, 92, 94. In such an embodiment, each position of the primary diverter valve 140 is in communication with a fluid line 142 that delivers fluid 38 to one of the first, second or third fluid sprayers 90, 92, 94. Each fluid line 142 connected to the first, second and third fluid sprayers 90, 92, 94, respectively, can include a dedicated diverter valve 144 that apportions fluid 38 between the various subsprayers 96 within each of the first, second and third fluid sprayers 90, 92, 94, respectively.

Referring again to FIGS. 7-10, it is contemplated that the electrovalve 112 and one or more diverter valves 130 can be operated through an algorithm that sequences the operation of each of the first, second and third fluid sprayers 90, 92, 94 and the subsprayers 96 for each of the air filters 30 according to a preset algorithm. This preset algorithm serves to sequentially operate the spraying of filter portions 98 of the first, second and third lint filters 80, 82, 84 to maximize the spraying operation of each of the fluid sprayers 36 and also minimize the obstruction that may be caused by adhesion of the fluid 38 on the various filter portions 98 of the first, second and third lint filters 80, 82, 84. It is contemplated that the spraying cycle for cleaning the plurality of air filters 30 within the lint removal system 10 can occur during each drying cycle of the laundry appliance 12. Accordingly, each of the first, second and third lint filters 80, 82, 84 is sprayed at least once during each drying cycle. As discussed above, the first lint filter 80 may capture more lint 32 during each drying cycle. Accordingly, the first lint filter 80, in various embodiments, may be sprayed multiple times during a particular drying cycle of the laundry appliance 12. The second and third lint filters 82, 84 may be sprayed less during a particular drying cycle, and may be sprayed only at the conclusion of a particular drying cycle.

Referring again to FIGS. 2-6, it is contemplated that each air filter 30 within the lint removal system 10 can be spaced apart from the other air filters 30 and can be placed in a parallel configuration with each of the other air filters 30 of the lint removal system 10. The spacing between each of the air filters 30 of the lint removal system 10 allows for each respective fluid sprayer 36 to effectively deliver fluid 38 to a front surface 150 of each of the first, second and third lint filters 80, 82, 84 and without interfering with the operation of an adjacent air filter 30 by spraying fluid 38 on the back surface 152 of an adjacent air filter 30. By way of example, and not limitation, the second fluid sprayer 92 can be adapted to spray fluid 38 on the front surface 150 of the second lint filter 82. The second lint filter 82 is spaced sufficiently far enough from the first lint filter 80 such that operation of the second fluid sprayer 92 can spray fluid 38 onto the front surface 150 of the second lint filter 82 without depositing fluid 38 or depositing substantial amounts of the fluid 38 on the back surface 152 of the first lint filter 80. It is contemplated that the sequencing of activation and deactivation of the particular subsprayers 96 within the first, second and third fluid sprayers 90, 92, 94 can be configured to minimize the effect of inadvertent spray from contacting a back surface 152 of the first or second lint filters 80, 82 as a result of the operation of the second and third fluid sprayers 92, 94.

In order to properly space each of the air filters 30 within the lint removal system 10, a gap of approximately 10 mm may be considered between each of the air filters 30 to avoid obstruction by lint 32 and also allows installation and operation of nozzles 160 for the subsprayers 96 during use of the laundry appliance 12. While 10 mm is used as an example herein, the distance between the air filters 30 can vary to be either greater than or less than 10 mm between adjacent air filters 30. The individual spaces between the various air filters 30 within the lint removal system 10 can also vary. As a non-limiting example, the space between the first and second lint filters 80, 82 may be greater than the space between the second and third lint filters 82, 84 where it is contemplated that less lint 32 will accumulate between the second and third lint filters 82, 84 than between the first and second lint filters 80, 82.

The first, second and third fluid sprayers 90, 92, 94 can be positioned above or within the air path 20 adjacent to the respective air filter 30. It is also contemplated that the first, second and third fluid sprayers 90, 92, 94 can be incorporated within a wall 170 of the air path 20 for delivering fluid 38 to the first, second and third lint filters 80, 82, 84.

Referring again to FIGS. 2-8, the first, second and third fluid sprayers 90, 92, 94 can include a plurality of nozzles 160 that correspond to each of the subsprayers 96 for the first, second and third fluid sprayers 90, 92, 94. Each of the nozzles 160 can deliver fluid 38 in a predetermined fluid path 180 for cleaning the corresponding filter portion 98 of the first, second or third lint filter 80, 82, 84. The fluid path 180 emanating from each nozzle 160 can take any one of various shapes that can include, but is not limited to, a fan spray, a cascade spray, a plurality of individual spray jets, an angled spray path, various shaped or contoured spray patterns, combinations thereof, and other similar fluid paths 180. The particular fluid path 180 can be based upon various factors that may include the desired filter portion 98 of the particular air filter 30 to be sprayed, the shape of the air filter 30, the spacing of the air filters 30, and other similar considerations.

According to the various embodiments, the various fluid sprayers 36 can be adapted to direct the fluid 38 in various configurations and directions with respect to the respective air filter 30. It is contemplated that, in various embodiments, one or more of the fluid sprayers 36 can direct fluid 38 toward the back surface 152 of the respective air filter 30. In such an embodiment, any one or more of the fluid sprayers 36 can direct fluid 38 through the back surface 152 of the respective air filter 30 in order to push lint 32 off from and away from the front surface 150 of the respective air filter 30. It is also contemplated, in various embodiments, that at least one of the fluid sprayers 36 can be adapted to direct the fluid 38 toward the front surface 150 of a respective air filter 30 and at least one of the other fluid sprayers 36 can be adapted to direct fluid 38 toward the back surface 152 of the corresponding air filter 30.

By way of example, and not limitation, the first fluid sprayer 90 can be configured to direct fluid 38 to the back surface 152 of the first lint filter 80. The second and third fluid sprayers 92, 94 can be configured to direct the flow of fluid 38 to the front surface 150 of the second and third lint filters 82, 84, respectively. While this exemplary embodiment is disclosed, it should be understood that various combinations of front surface 150 fluid sprayers 36 and back surface 152 fluid sprayers 36 can be included in a particular filter spray system 34 of a laundry appliance 12.

According to the various embodiments, it is contemplated that the spray sequence for cleaning the two or more air filters 30 contained within the lint removal system 10 can be activated by various methods. One such method includes a timer that automatically activates a spray sequence according to certain times within a particular drying cycle. It is contemplated that each type of drying cycle may have a corresponding spray sequence that accounts for the type of clothing being dried and various other parameters that may be indicative of a particular drying cycle. By way of example, and not limitation, a drying cycle for delicates may result in less accumulation of lint 32 within the plurality of air filters 30 such that fewer spray sequences may need to be performed. Conversely, a drying sequence for drying towels may require the performance of more frequent spray cycles to clean the plurality of air filters 30 more times to remove greater amounts of lint 32 that may be accumulated within the plurality of air filters 30.

According to various embodiments, the various spray cycles may also be initiated through a temperature-related signal where an increase in temperature of the compressor 50 for the heat pump system 14 may initiate a spray sequence for cleaning the plurality of air filters 30. As an example, as lint 32 accumulates within one or more of the plurality of air filters 30, the movement of air 24 through the air path 20 may become progressively blocked through the accumulation of lint 32. As the movement of air 24 within the air path 20 becomes blocked, the transfer of heat 190 from the heat exchangers 16 to the air 24 within the air path 20 also becomes more inefficient. Accordingly, the compressor 50 may have to operate at longer intervals to maintain the desired parameters for operating the laundry appliance 12. The longer operation of the compressor 50 increases the temperature in and around the compressor 50. This increase in temperature can be communicated to the laundry appliance 12 through a thermostat, thermocouple, thermistor, or other similar sensor. The sensor of the compressor 50 can communicate temperature readings to a control for the laundry appliance 12 indicating that the blockage of lint 32 is sufficient such that the increase in temperature of the compressor 50 needs to be addressed and the spray sequence needs to be activated to remove a build-up of lint 32 causing the temperature increase within the compressor 50.

Other mechanisms for activating a spray sequence can include, but are not limited to, a lint detector, airflow monitors, and other similar monitors that serve to indicate a build-up of lint 32 within the plurality of air filters 30.

Referring again to FIGS. 4-6, after the fluid sprayers 36 are activated, the fluid 38 from the first, second, and third fluid sprayers 90, 92, 94 as well as the lint 32 collected from the first, second and third lint filters 80, 82, 84, is moved to the drain channel 28 positioned below the evaporator 54 of the heat pump system 14. According to the various embodiments, it is contemplated that the condensed fluid 38 precipitated by the evaporator 54 drops into the same drain channel 28 as that of the sprayed fluid 38 and lint 32 mixture. To promote the flow of lint 32 and fluid 38 within the drain channel 28 toward the fluid pump 40, the drain channel 28 can be sloped or otherwise disposed at a particular angle. This angle can be any one of various angles that promotes the flow of fluid 38, and potentially lint 32, from the front portion 200 of the basement 202, where the air filters 30 and fluid sprayers 36 are located, to the rear portion 204 of the basement 202, where the fluid pump 40 is located. Additionally, the drain channel 28 can include a separate fluid sprayer 36 that can be activated to move fluid 38 and lint 32 within the drain channel 28 and toward the fluid pump 40. The volume of the drain channel 28 can also vary and can be defined based upon an energy tradeoff. The size of a front opening can affect the maximum amount of lint 32 drainable. By way of example, and as a conservative approach, a 35 mm front opening section in the front portion 200 of the drain channel 28 and an approximately 65 mm rear opening section at the rear portion 204 of the drain channel 28 can be used. It should be understood that other front and rear opening sections can be modified depending upon the desired performance of the particular laundry appliance 12.

Figure 6:
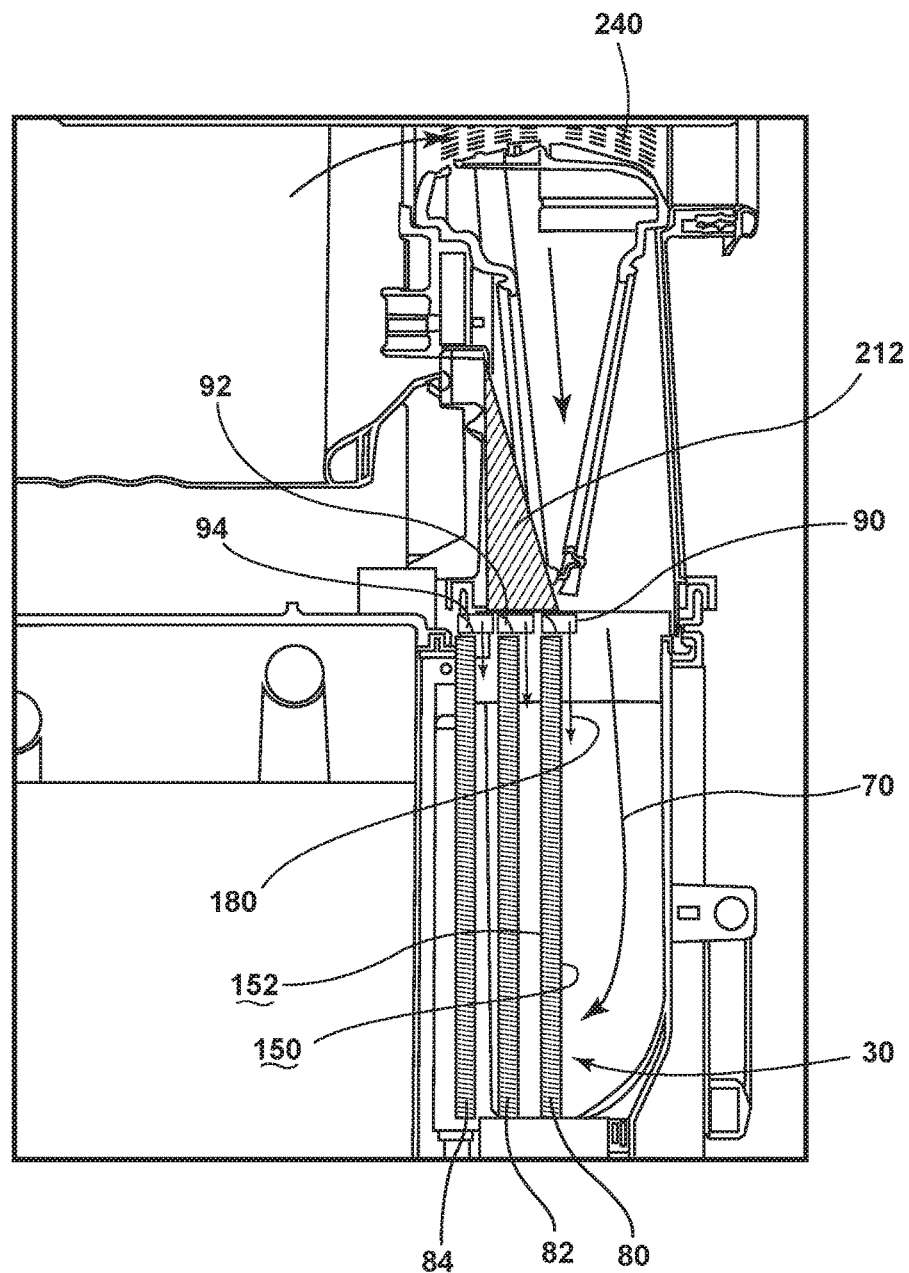
FIG. 6 is a detailed cross-sectional view of a laundry appliance incorporating an aspect of the multi-filter lint removal system.
Figure 7:
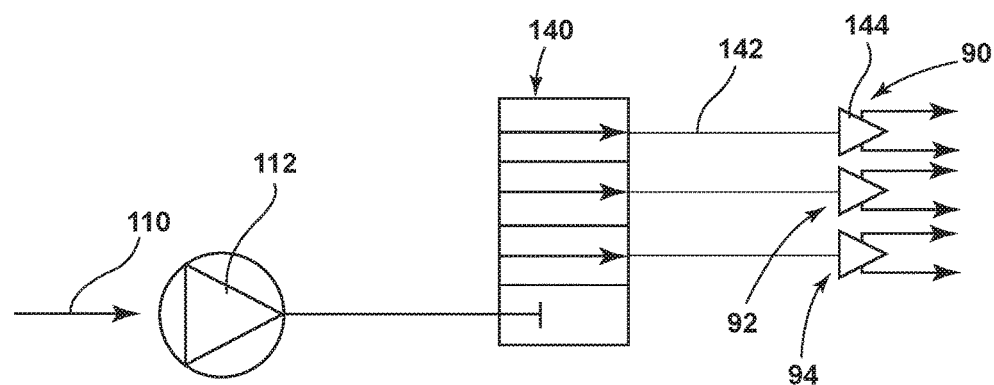
FIG. 7 is a schematic diagram illustrating a fluid flow system for delivering fluid to the multi-filter lint removal system.
Figure 8:
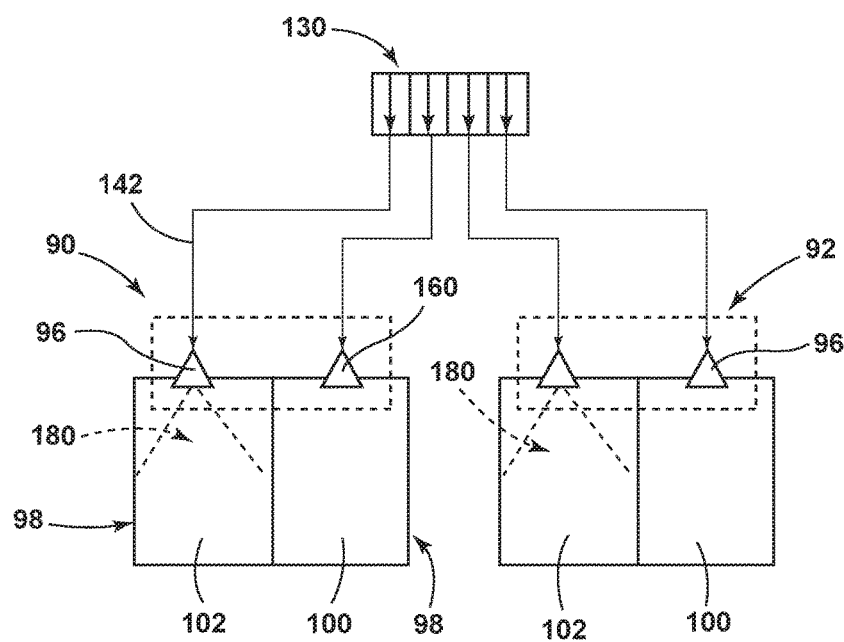
FIG. 8 is a schematic diagram illustrating an aspect of a diverter valve for delivering fluid to multiple filters of an aspect of the lint removal system.
Figure 9:
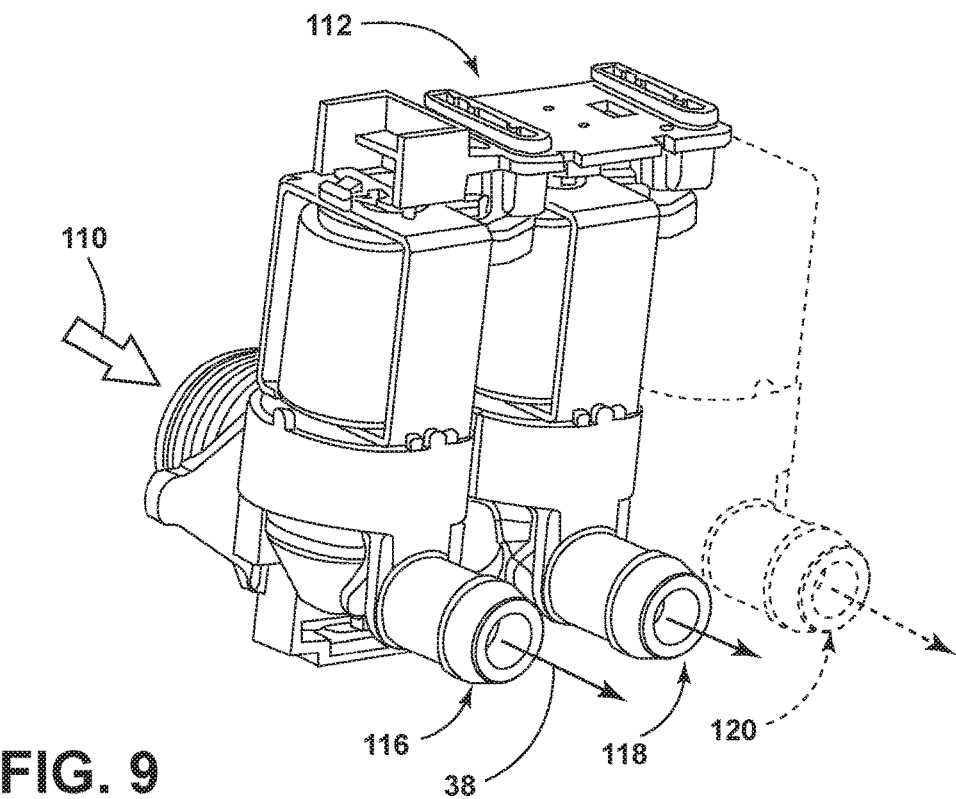
FIG. 9 is a perspective view of an aspect of a water inlet valve for delivering fluid throughout an appliance incorporating an aspect of the multi-filter lint removal system.
Figure 10:
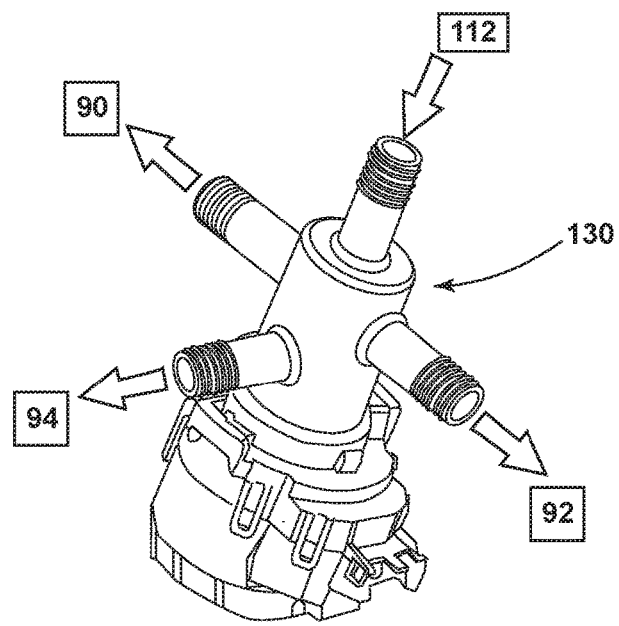
FIG. 10 is a top perspective view of a diverter valve incorporated within an aspect of the multi-filter lint removal system.
Figure 11:
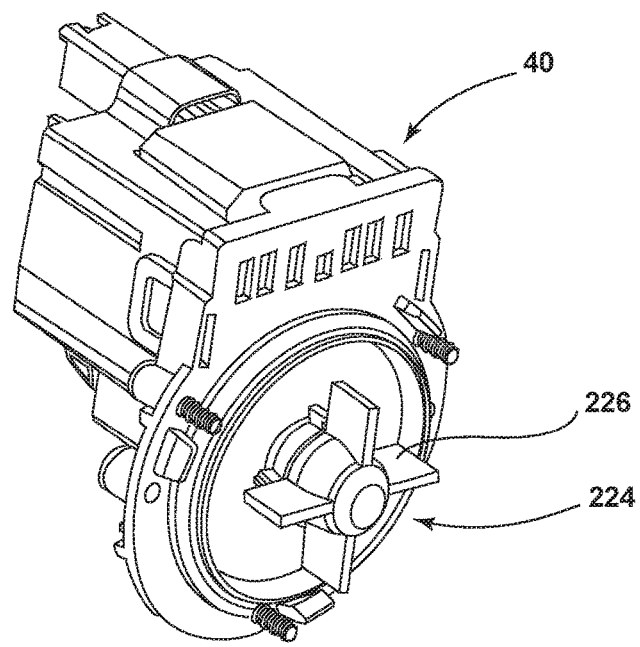
FIG. 11 is a partially exploded view of a fluid pump incorporated within an aspect of the multi-filter lint removal system.
Figure 12:
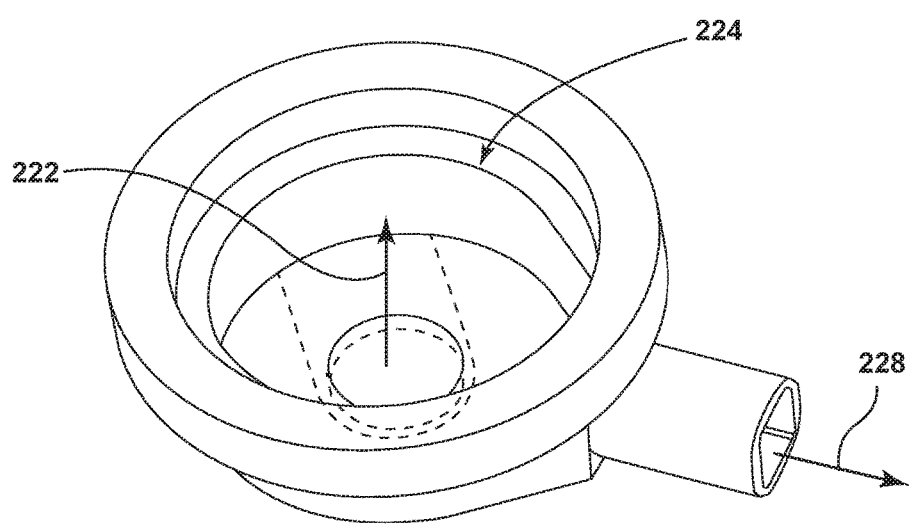
FIG. 12 is a top perspective view of an inlet valve for the fluid pump of FIG. 11.
Figure 13:
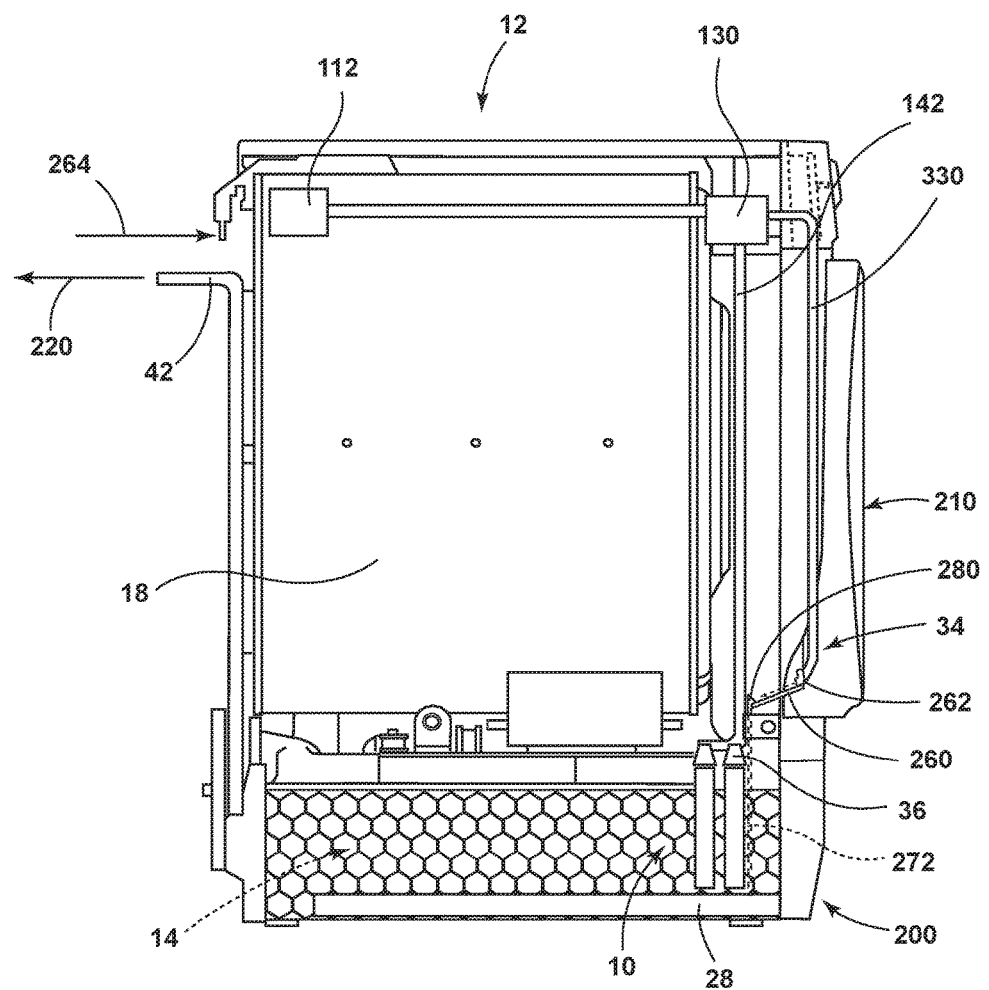
FIG. 13 is a cross-sectional view of a laundry appliance incorporating an aspect of the multi-filter lint removal system.
Figure 14:
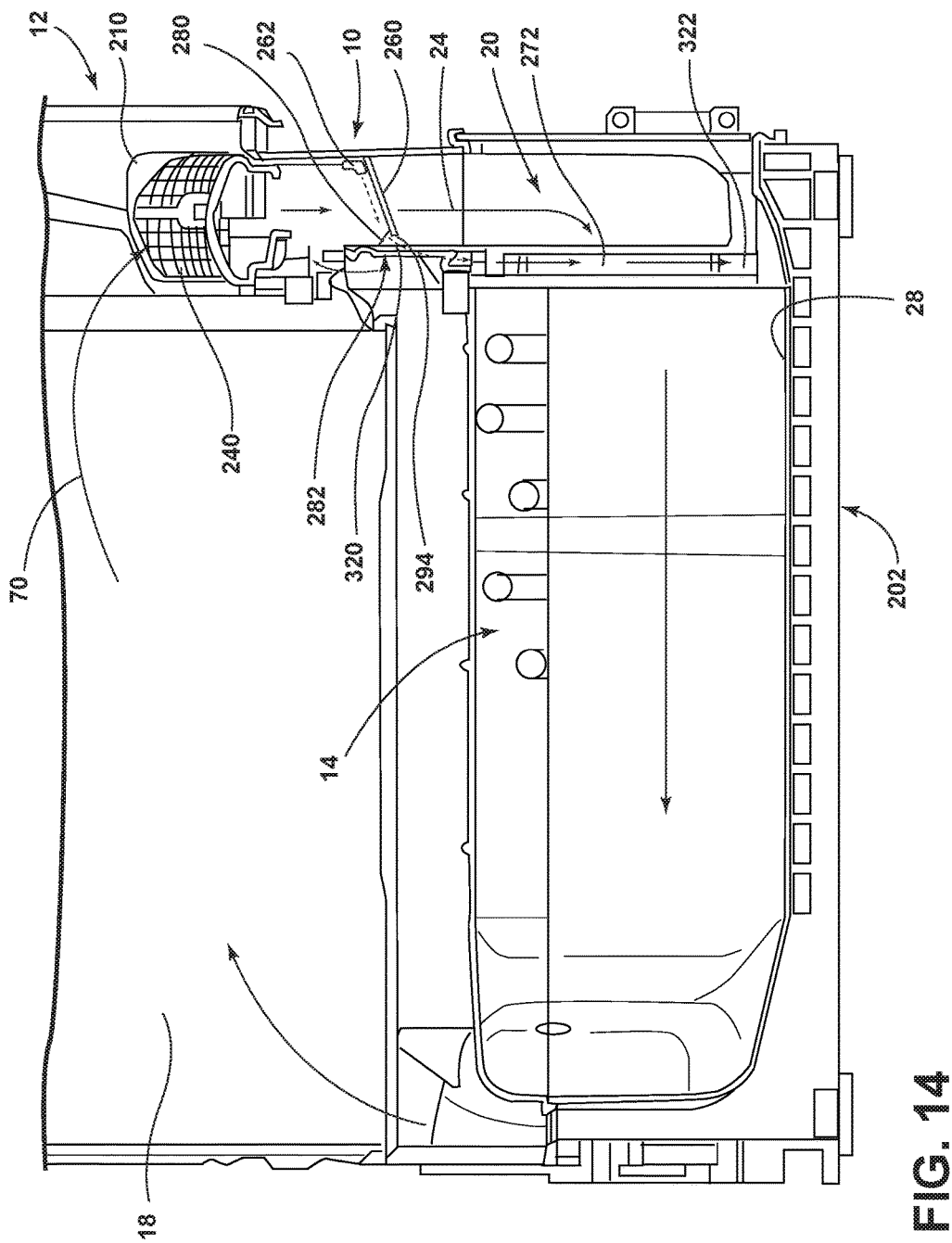
FIG. 14 is a partial cross-sectional view of the laundry appliance of FIG. 13, taken along line XIV-XIV.

Referring now to FIG. 6, because multiple air filters 30 are being used, the cross-sectional thickness of the plurality of air filters 30 positioned below the door opening 210 and may alter the configuration of the air path 20 as it moves through the laundry appliance 12. In order to direct the flow of air 24 through the air path 20, various air diverters 212 may be implemented within the laundry appliance 12 and in the air path 20 to direct the flow of air 24, such that the heated and humid air 70 from the drum 18, which typically contains lint 32, can be directed through each of the plurality of air filters 30 of the lint removal system 10. Accordingly, whether the lint removal system 10 includes only first and second lint filters 80, 82 or includes first, second and third lint filters 80, 82, 84 or includes additional lint filters, the various air diverters 212 that at least partially define the air path 20 can be used to ensure that the flow of air 24 through the air path 20 flows through each of the plurality of air filters 30 within the lint removal system 10. Also, as discussed above, it is contemplated that fewer spray sequences may be activated onto the third lint filter 84 as opposed to the second or first lint filters 82, 80.

According to the various embodiments, it is contemplated that the design of the lint removal system 10 is such that maintenance of the various air filters 30 and fluid sprayers 36 can be performed primarily by a service technician. Accordingly, the lint removal system 10 may not be equipped with a convenient access panel on the exterior of the laundry appliance 12. This is to deter an owner of the laundry appliance 12 who may not be knowledgeable as to the operation of the lint removal system 10 from trying to maintain the lint removal system 10. The lint removal system 10 is adapted to be substantially maintenance free, such that cleaning and/or maintenance of the heat pump system 14 and the lint removal system 10 is necessary only at substantially infrequent times, such as every six months, annually, bi-annually, every three years, or at greater time intervals, or after a large number of drying cycles of the laundry appliance 12.

Referring again to FIGS. 2-12, it is contemplated that all of the fluid 38 that is received from the external source and moved through the various inlet electrovalves 112, water pipes, diverter valves 130, nozzles 160, filters, drain channels 28, and other portions of the laundry appliance 12, is eventually moved through the fluid pump 40 of the laundry appliance 12 and out to the external drain 220 for elimination from the laundry appliance 12. It is contemplated that the fluid pump 40 can include a pump inlet 222 that collects fluid 38 and lint 32 from the drain channel 28 and moves the fluid 38 and lint 32 through an impeller chamber 224, where various impellers 226 draw in the fluid 38 and lint 32 and direct the fluid 38 and lint 32 to a drain conduit 228 and out of the laundry appliance 12 to an external drain 220. The fluid pump 40 can be positioned at a rear portion 204 of the laundry appliance 12 and the drain conduit 228 can extend upward from the fluid pump 40 such that the fluid pump 40 moves the fluid 38 and lint 32 upward through the drain channel 28 and out through the external drain 220. Within typical residential laundry rooms, the external fluid source 110 and external drains 220 are positioned adjacent to one another such that the drain conduit 228 needs to be positioned near the inlet electrovalve 112. In this manner, the lint 32 and fluid 38 can be properly eliminated from the laundry appliance 12.

Referring again to FIGS. 5 and 6, the incorporation of the lint removal system 10 is meant to make removal of lint 32 from the laundry appliance 12 a substantially maintenance-free operation. Accordingly, the laundry appliance 12 can be designed without a removable door-mounted lint filter as is present in conventional laundry dryers. While a removable lint filter is typically not installed within the door, a fence or similar blocking member 240 can be installed within the door opening 210 to prevent larger objects such as coins, Legos, pens, toys, and other similar objects from coming into contact with the first lint filter 80 of the lint removal system 10. This blocking member 240 can include a concave shape for capturing and retaining such items. It is also contemplated that the fence or blocking member 240 can have a convex shape such that larger items can simply roll or slide off the blocking member 240 or can be captured within a collection area adjacent to the blocking member 240.

While the inclusion of first, second and third lint filters 80, 82, 84 are discussed within various embodiments of the lint removal system 10, it is contemplated that the plurality of air filters 30 may include only first and second lint filters 80, 82. Various embodiments may also include first, second and third lint filters 80, 82, 84 and can also include a third lint filter 84. It is also contemplated that the lint removal system 10 disclosed herein can be positioned in the basement 202 of the laundry appliance 12, or can be positioned in another location of the laundry appliance 12 to provide space for various operational mechanisms of the laundry appliance 12. The lint removal system 10 described herein can also be included within a laundry appliance 12 that includes both washing and drying functions to be an all-in-one laundry appliance 12. It is contemplated that the lint removal system 10 can also be included within laundry appliances 12 of varying sizes, such as a small apartment-type laundry unit as well as a larger commercial-type laundry unit.

It is also contemplated that the lint removal system 10 can be incorporated within various types of appliances that incorporate a heat pump system 14 or other similar refrigerant systems. Such appliances can include, but are not limited to, dryers, refrigerators, freezers, chillers, and other similar appliances that incorporate a heat exchange mechanism.

As exemplified in FIGS. 13-17, the lint removal system 10 can include an angled lint filter 260 that is typically positioned upstream of the first, second and third lint filters 80, 82, 84. The angled lint filter 260 can also be positioned below the door opening 210 and within the air path 20, where the angled lint filter 260 is positioned therein to separate lint 32 from process air 24 moving through the air path 20. A portion of the filter spray system 34 in the form of an angled spray mechanism 262 is connected to a fluid source 264. The angled spray mechanism 262 is positioned at a first edge 266 of the angled lint filter 260 to spray fluid 38 onto a portion of the angled lint filter 260 in order to remove and capture lint 32 that has been entrapped by a surface of the angled lint filter 260. As the angled spray mechanism 262 projects a stream of fluid 38 along a surface of the angled lint filter 260, captured lint 270 from the upstream surface 268 of the angled lint filter 260 is moved to a lint drain 272 that extends from a second edge 274 of the angled lint filter 260 down to an area near the drain channel 28. The lint drain 272 is typically positioned to allow for movement of the fluid 38 and captured lint 270 from the angled lint filter 260 to be delivered to the drain channel 28 in substantially the same manner as captured lint 270 is removed from the first, second and third lint filters 80, 82, 84 toward the common drain channel 28. The angled lint filter 260 can be used in conjunction with any number of the typically vertically oriented first, second and third lint filters 80, 82, 84. Accordingly, the lint removal system 10 may include the angled lint filter 260 along with only the first lint filter 80. The angled lint filter 260 may also be accompanied by additional vertically oriented filters that make up the first, second and third lint filters 80, 82, 84.

Referring again to FIGS. 14-17, a bypass member 280 can be positioned at or near the second edge 274 of the angled lint filter 260. The bypass member 280 is selectively operable to a blocking position 282 that directs process air 24 through the angled lint filter 260 and toward the first, second and third lint filters 80, 82, 84 for further removal of lint 32 from the air 24 moving through the air path 20. The bypass member 280 is also operable to a drain position 284 that allows for movement of material from the upstream surface 268 of the angled lint filter 260 and into the lint drain 272 for disposal into the drain channel 28.

Figure 16:
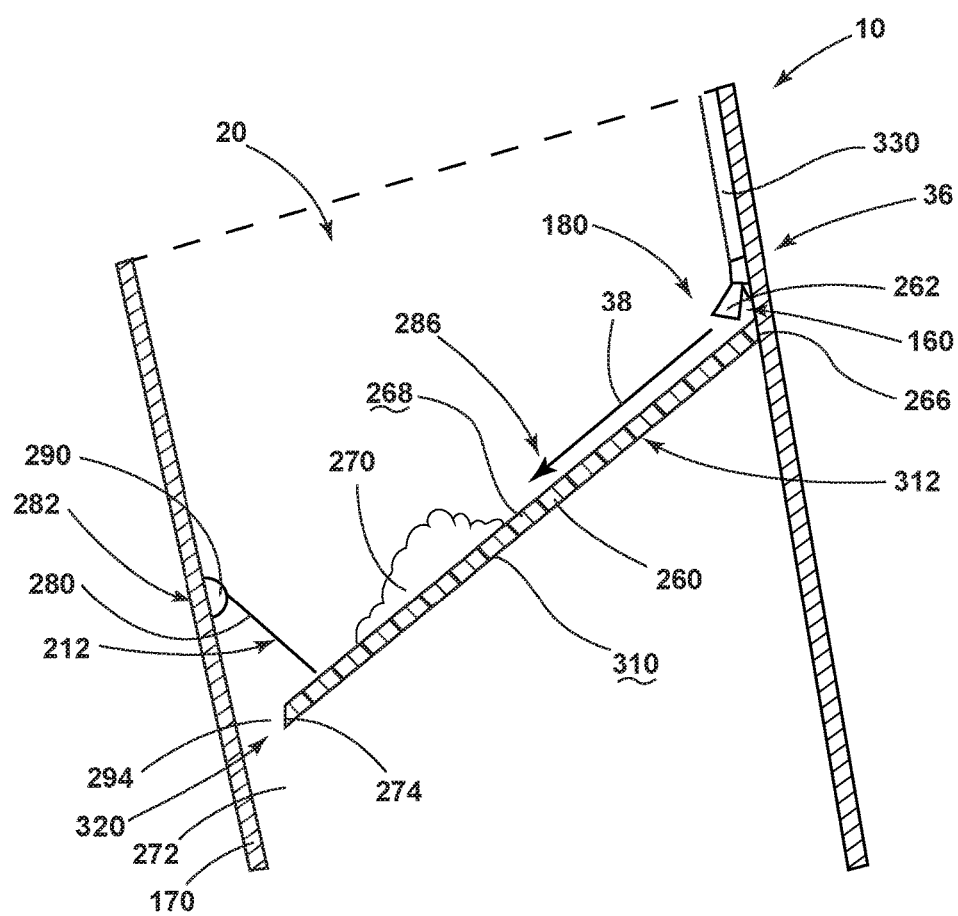
FIG. 16 is a cross-sectional view of the door air filter of FIG. 15 showing operation of a spray mechanism for cleaning lint from the door air filter.
Figure 17:
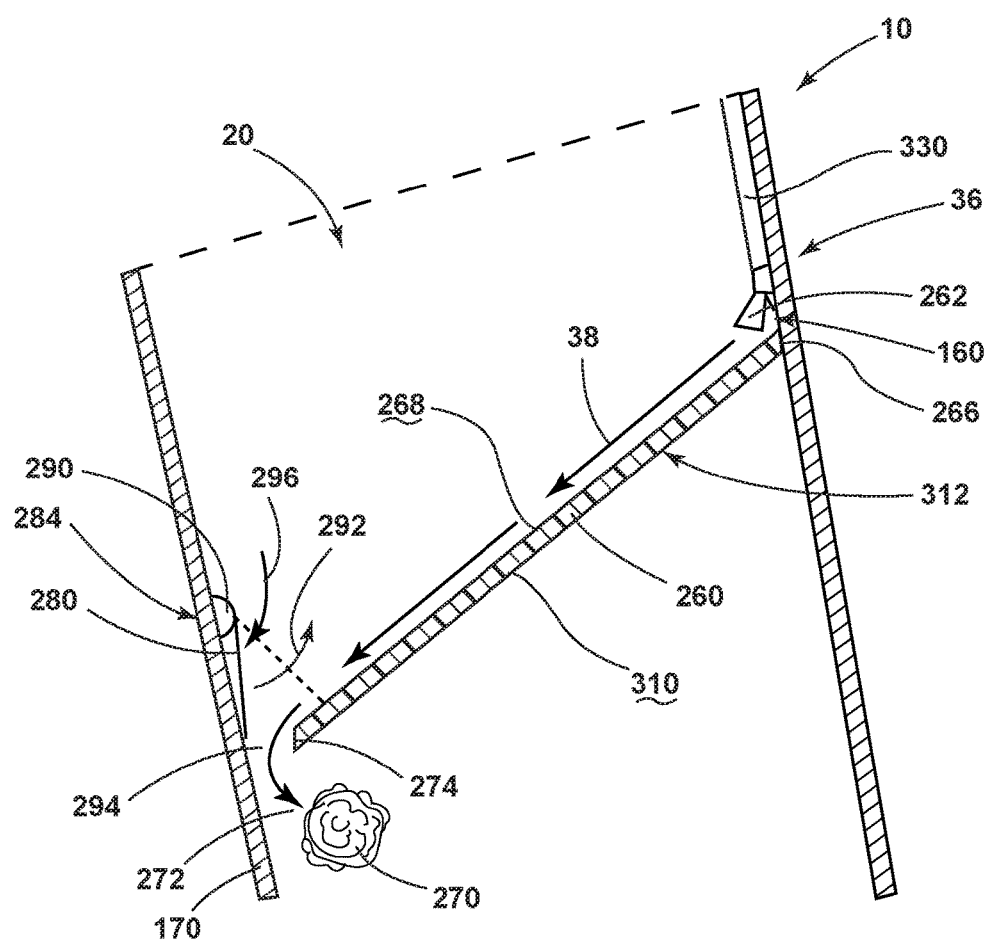
FIG. 17 is a cross-sectional view of the door air filter of FIG. 16 and showing the bypass member being moved to the drain position.

As exemplified in FIGS. 16-17, when the bypass member 280 is in the drain position 284, fluid 38 from the angled spray mechanism 262, along with captured lint 270 that is pushed by the fluid 38 from the angled spray mechanism 262, can be moved along the upstream surface 268 of the angled lint filter 260 and into the lint drain 272. Typically, the back pressure of the fluid 38 emanating from the angled spray mechanism 262 will have a force 286 sufficient to move the bypass member 280 from the blocking position 282 and into the drain position 284. The bypass member 280 includes a biasing mechanism 290 that applies a biasing force 292 upon the bypass member 280 in the direction of the blocking position 282. When the fluid 38 is sprayed from the angled spray mechanism 262, the force 286 of the fluid 38 overcomes this biasing force 292 applied by the biasing mechanism 290 to move the bypass member 280 from the blocking position 282 to the drain position 284. Accordingly, the force 286 of the fluid 38 moves the bypass member 280 to open an access aperture 294 to the lint drain 272 to allow for movement of the fluid 38 and captured lint 270 into and through the lint drain 272 and to the drain channel 28.

Referring again to FIGS. 14-16, when the angled spray mechanism 262 is deactivated, and the force 286 of the fluid 38 is no longer present, the biasing mechanism 290 biases the bypass member 280 back into the blocking position 282. In various embodiments, the bypass member 280 may include one or more drain holes 302 or weep holes. These drain holes 302 allow excess fluid 38 to move or flow past the bypass member 280 and into the lint drain 272 when the opposing biasing force 296 of the fluid 38 is not present. These drain holes 302 are sized and positioned to allow the excess fluid 38 to drain without impeding the flow of air 24 through the air path 20 when the blocking member 240 is in the blocking position 282. The drain holes 302 are also configured to prevent whistling or other air-related noise. The drain holes 302 may also be positioned within the second edge 274 of the angled lint filter 260. The excess fluid 38 may also drain through the filtering material 312 and fall to the drain channel 28.

The angled lint filter 260 is typically positioned at an angle such that gravity may at least partially assist in the movement of fluid 38 and captured lint 270 from the upstream surface 268 of the angled lint filter 260 toward the bypass member 280. Typically, the gravitational force 286 of the fluid 38 and captured lint 270, by itself, is insufficient to manipulate the bypass member 280 from the blocking position 282 to the drain position 284. The fluid pressure of the fluid 38 projected from the angled spray mechanism 262 generates an opposing biasing force 296 that engages the bypass member 280 to manipulate the bypass member 280 from the blocking position 282 to the drain position 284 for disposal of the captured lint 270 to the drain channel 28.

As exemplified in FIGS. 14-17, the angled position of the angled lint filter 260 is such that the first edge 266 of the angled lint filter 260 is typically positioned toward the front portion 200 of the cabinet and the lower second edge 274 is positioned rearward of the first edge 266. Through this configuration, the angled spray mechanism 262 projects fluid 38 in a predetermined spray pattern or fluid path 180 away from the front portion 200 of the cabinet and toward the drain channel 28 of the lint removal system 10. The angled spray mechanism 262 can direct a stream of fluid 38 onto the upstream surface 268 of the angled lint filter 260 to push the captured lint 270 toward the bypass member 280 and bias the bypass member 280 into the drain position 284.

The angled spray mechanism 262 can also be positioned to spray fluid 38 onto a downstream surface 310 or back side of the angled lint filter 260 such that fluid 38 is directed through the filtering material 312 of the angled lint filter 260 for directing captured lint 270 toward the bypass member 280. In such an embodiment, a portion of the bypass member 280 may extend past the angled lint filter 260 and adjacent the downstream surface 310. In this manner, fluid 38 sprayed toward a downstream surface 310 of the angled lint filter 260 can also be directed to this extended portion of the bypass member 280 to bias the bypass member 280 from the blocking position 282 to the drain position 284 for disposal of the captured lint 270.

Referring again to FIGS. 13-17, when the bypass member 280 is in the blocking position 282, the bypass member 280 covers the access aperture 294 proximate a top end 320 of the lint drain 272. When the angled spray mechanism 262 is activated and fluid 38 is directed to bias the bypass member 280 to the drain position 284, the bypass member 280 moves to the drain position 284 and opens the access aperture 294 at the top end 320 of the lint drain 272. The lint drain 272 can be a tube, shaft, interstitial space, or other conduit that extends from the top end 320 proximate the bypass member 280 to a bottom end 322 that is positioned over or at least near the drain channel 28 so that captured lint 270 can be disposed into the drain channel 28. The lint drain 272 can also be at least partially defined by a wall 170 of the air path 20 and can be entirely contained within the air path 20.

Figure 15:
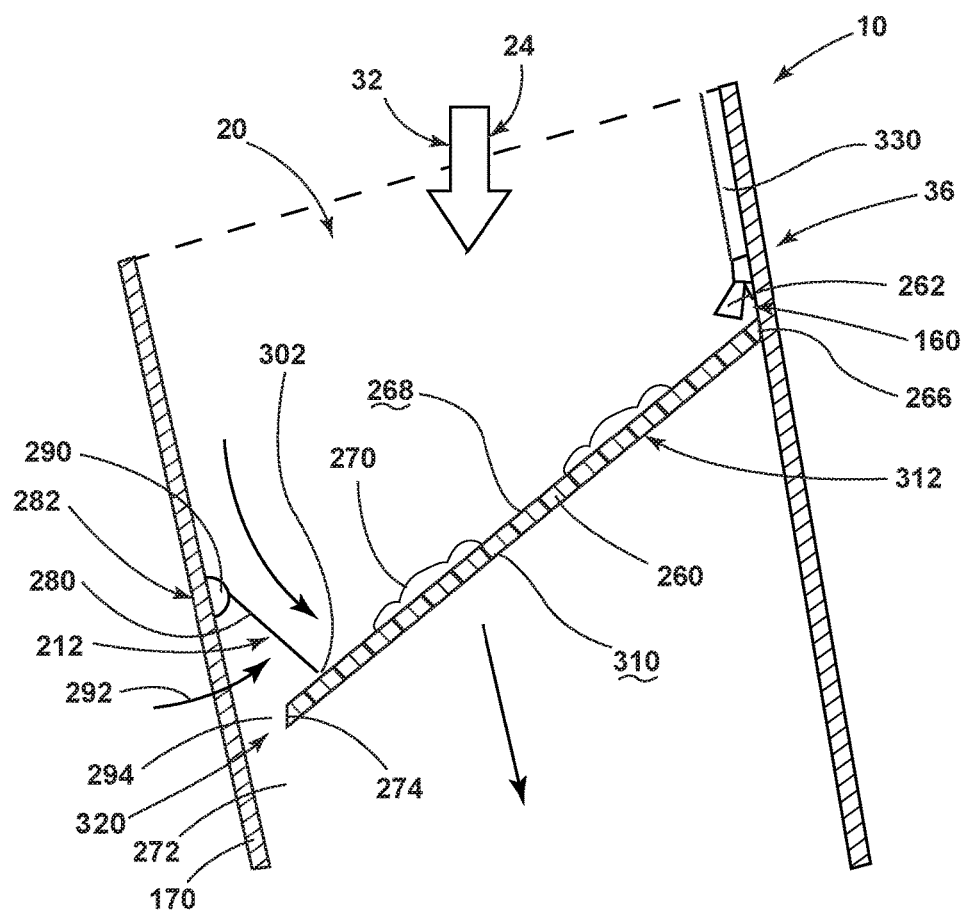
FIG. 15 is an enlarged cross-sectional view of the appliance of FIG. 14, taken at area XV and exemplifying an aspect of an angled door air filter having an operable bypass member.

As exemplified in FIG. 15, when the bypass member 280 is in the blocking position 282, the bypass member 280 may act as an aspect of the air diverter 212 that manipulates the flow of air 24 through the air path 20 for efficient movement through the angled lint filter 260 as well as the first, second and third lint filters 80, 82, 84 of the lint removal system 10. The bypass member 280 can include the biasing mechanism 290 in the form of a spring or other biasing mechanism 290.

The bypass member 280 may also be in the form of an elastomeric member having a shape that tends toward the blocking position 282. In such an embodiment, the biasing force 292 of the fluid 38 directed from the angled spray mechanism 262 serves to deflect a portion of the elastomeric bypass member 280 toward the drain position 284 to open the lint drain 272 and allow for movement of the fluid 38 and captured lint 270 into the lint drain 272. After the angled spray mechanism 262 is deactivated, the elastomeric nature of the bypass member 280 serves to return the bypass member 280 to its original shape that defines the blocking position 282.

Referring again to FIGS. 13 and 14, the angled spray mechanism 262 for the angled lint filter 260 can include a secondary fluid line 330 connected with the diverter valve 130, or in some instances, the primary diverter valve 140. Because the angled lint filter 260 is typically positioned as the initial lint filtering member of the lint removal system 10, lint 32 will collect on the angled lint filter 260 more rapidly during operation of the appliance 12. Accordingly, activation of the angled spray mechanism 262 corresponding to the angled lint filter 260 may be operated more frequently to remove the captured lint 270 from the angled lint filter 260. In this instance, the diverter valve 130 can be operated to allow for the more frequent flow of fluid 38 through the secondary fluid line 330 and to the angled spray mechanism 262 for the angled lint filter 260. Fluid 38 from the angled spray mechanism 262 may also be directed through the lint drain 272 and toward one or more of the first, second and third lint filters 80, 82, 84 to assist in removing lint 32 from these lint filters.

The angled lint filter 260 and the first, second and third lint filters 80, 82, 84 can include filtering material 312 having gradually decreasing mesh sizes or gradually decreasing pore size. In this manner, each successive filter of the lint removal system 10 can be adapted to capture smaller sized particles of lint 32. In such a configuration, the angled lint filter 260 will typically have the largest mesh size or pore size for capturing the largest lint particles and also the largest amount of lint 32. The next filter in line, the first lint filter 80, will typically have a slightly smaller mesh or pore size for capturing smaller lint particles. The first lint filter 80 will also typically capture less lint 32 than the angled lint filter 260. Where the lint removal system 10 includes additional lint filters, such as the second lint filter 82, third lint filter 84, or subsequent lint filters, each successive lint filter can typically be configured to capture smaller sized particles of lint 32 and also smaller amounts of lint 32.

In various embodiments, the angled lint filter 260 may include multiple spray nozzles 160, where each spray nozzle 160 is operated independently through operation of dedicated diverter valves 130. It is also contemplated that the angled spray mechanism 262 for the angled lint filter 260 may be a single spray nozzle 160 that is adapted to direct a flow of fluid 38 across the entire upstream surface 268 of the angled lint filter 260. In configurations where the angled spray mechanism 262 includes multiple spray nozzles 160, the bypass member 280 can be adapted to be manipulated from the blocking position 282 to the drain position 284 by either of the multiple spray nozzles 160 of the angled spray mechanism 262. The bypass member 280 may also be configured as two separate bypass members 280 that correspond to each spray nozzle 160 of the angled spray mechanism 262 serving the angled lint filter 260.

The fluid 38 directed through the secondary fluid line 330 into the angled spray mechanism 262 can be directed from an external fluid source 110 such as a household spigot or faucet. Fluid 38 may also be directed to the secondary fluid line 330 through a dedicated pump that may move fluid 38 from a fluid source 264 within the appliance 12. The internal source of fluid 38 may be captured condensate 26 that may be collected through operation of a heat exchange or heat pump system 14 of the appliance 12.

While the angled lint filter 260 is shown as having a particular angled configuration, it should be understood that the exact angle of the angled lint filter 260 can vary depending upon the design of the appliance 12. It should also be understood that the angled lint filter 260 may be configured to be angled in the opposite direction, or may be angled from the left side of the appliance 12 toward the right side of the appliance 12, or vice versa. The exact configuration of the angled lint filter 260 as well as the positioning of the angled spray mechanism 262 may vary depending upon the exact design of the appliance 12 that incorporates the lint removal system 10.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A laundry appliance comprising:
a rotating drum for processing laundry;
a blower that directs process air through an air path that includes the rotating drum;
a heat exchanger positioned within the air path that cools and dehumidifies the process air;
a plurality of air filters arranged sequentially that capture lint from the process air at respective positions upstream of the heat exchanger;
a filter spray system having a plurality of fluid sprayers that deliver fluid to a surface of each air filter of the plurality of air filters, wherein each fluid sprayer of the plurality of fluid sprayers directs captured lint away from a respective air filter of the plurality of air filters.

2. The laundry appliance of claim 1, wherein the filter spray system includes a diverter valve that selectively apportions the fluid between the plurality of fluid sprayers.

3. The laundry appliance of claim 1, wherein:
the plurality of air filters includes first and second lint filters that are positioned in a parallel arrangement adjacent to the heat exchanger; and
the filter spray system includes first and second fluid sprayers that deliver the fluid to the first and second air filters, respectively.

4. The laundry appliance of claim 2, wherein each fluid sprayer of the plurality of fluid sprayers includes a plurality of spray nozzles.

5. The laundry appliance of claim 4, wherein each air filter includes two spray nozzles that are operated sequentially and to direct water to different portions of the respective air filter.

6. The laundry appliance of claim 4, wherein the plurality of spray nozzles are configured to direct a spray of the fluid into an upstream surface of the respective air filter of the plurality of air filters.

7. The laundry appliance of claim 4, wherein the diverter valve apportions the fluid between the plurality of spray nozzles.

8. The laundry appliance of claim 1, further comprising:
a drain channel positioned below the plurality of air filters, wherein the plurality of fluid sprayers directs the fluid across the plurality of air filters and into the drain channel.

9. The laundry appliance of claim 8, wherein the drain channel also receives condensate from the heat exchanger.

10. The laundry appliance of claim 9, wherein the drain channel is sloped to direct the condensate and the fluid to a fluid pump.

11. The laundry appliance of claim 3, wherein:
the first lint filter is positioned upstream of the heat exchanger and the second lint filter is positioned between the first lint filter and the heat exchanger; and
the first and second lint filters each include a mesh that captures the lint, the first lint filter having a first mesh size and the second lint filter having a second mesh size that is smaller than the first mesh size.

12. The laundry appliance of claim 1, further comprising:
a blocking member that is positioned upstream of the plurality of air filters.

13. A lint removal system for a laundry appliance, the lint removal system comprising:
an air moving unit that directs process air through an air path for processing laundry;
a heat exchanger that dehumidifies the process air within the air path;
first and second lint filters positioned upstream of the heat exchanger for capturing lint particles from the process air;
a first fluid sprayer that directs fluid to a surface of the first lint filter for removing captured lint from the first lint filter;
a second fluid sprayer that directs the fluid to a surface of the second lint filter for removing the captured lint from the second lint filter; and
a diverter valve that selectively apportions the fluid between the first and second fluid sprayers, wherein the fluid from the first and second fluid sprayers and the captured lint from the first and second lint filters are directed to a common drain channel.

14. The lint removal system of claim 13, wherein the common drain channel also receives condensate from the heat exchanger.

15. The lint removal system of claim 13, further comprising:
a third lint filter for capturing lint particles from the process air; and
a third fluid sprayer that directs the fluid to a surface of the third lint filter for removing the captured lint from the third lint filter, wherein the diverter valve selectively apportions the fluid between the first, second and third fluid sprayers.

16. The lint removal system of claim 13, wherein each of the first and second fluid sprayers includes two spray nozzles that are operated to sequentially direct water to separate filter portions disposed within a respective lint filter of the first and second lint filters.

17. The lint removal system of claim 13, wherein the first and second fluid sprayers are positioned to direct a spray of the fluid into an upstream surface of the first and second lint filters, respectively.

18. A lint removal system for a laundry appliance, the lint removal system comprising:
a plurality of air filters that capture lint within an air path at a position upstream of a heat exchanger;
a plurality of fluid sprayers that direct fluid onto the plurality of air filters, respectively, to remove captured lint from the plurality of air filters;
a diverter valve that apportions the fluid between the plurality of fluid sprayers; and
a drain channel that is positioned below the heat exchanger and below the plurality of air filters to receive condensate from the heat exchanger and receive the fluid and captured lint from the plurality of air filters.

19. The lint removal system of claim 18, wherein the drain channel is sloped to direct the condensate and the fluid to a fluid pump.

20. The lint removal system of claim 19, wherein the fluid pump directs the condensate and fluid to a fluid outlet.

* * * * *